United States Patent
Bhola et al.

(10) Patent No.: US 12,547,589 B2
(45) Date of Patent: Feb. 10, 2026

(54) SYSTEMS AND METHODS FOR BLOCK PROPERTIES IN LOG-STRUCTURED MERGE TREE STORAGE

(71) Applicant: Cockroach Labs, Inc., New York, NY (US)

(72) Inventors: Sumeer Kumar Bhola, Brooklyn, NY (US); Jackson Blair Owens, Brooklyn, NY (US)

(73) Assignee: Cockroach Labs, Inc., New York, NY (US)

( * ) Notice: Subject to any disclaimer, the term of this patent is extended or adjusted under 35 U.S.C. 154(b) by 11 days.

(21) Appl. No.: 18/448,301

(22) Filed: Aug. 11, 2023

(65) Prior Publication Data

US 2024/0054103 A1   Feb. 15, 2024

Related U.S. Application Data

(60) Provisional application No. 63/397,176, filed on Aug. 11, 2022.

(51) Int. Cl.
*G06F 16/13* (2019.01)

(52) U.S. Cl.
CPC .................................... *G06F 16/13* (2019.01)

(58) Field of Classification Search
CPC ........................................................ G06F 16/13
See application file for complete search history.

(56) References Cited

U.S. PATENT DOCUMENTS

| | | | |
|---|---|---|---|
| 10,893,067 B1 * | 1/2021 | Geil | G06F 16/24532 |
| 2008/0104070 A1 * | 5/2008 | Lonchar | G06F 16/2428 |
| 2022/0197904 A1 * | 6/2022 | Gillis | G06F 16/2455 |
| 2022/0319597 A1 * | 10/2022 | Moyer | G11C 15/046 |

* cited by examiner

*Primary Examiner* — Van H Oberly
(74) *Attorney, Agent, or Firm* — Goodwin Procter LLP

(57) ABSTRACT

Systems and methods for encoding block properties for data structures and filtering data structures using block properties are provided. A group of a plurality of key-value entries can be added to a data block of a data file. A block property indicative of attributes of the group of the plurality of key-value entries can be determined. The block property can be encoded in a block handle and added to an index block of the data file. A query directed to a plurality of data files can be received from a client device. A target block property included in the query can be compared to a block property corresponding to a data block of a data file of the plurality of data files. Based on the target block property intersecting with the block property of the data block, values corresponding to the data block can be sent to the client device.

30 Claims, 12 Drawing Sheets

SYSTEMS AND METHODS FOR BLOCK PROPERTIES IN LOG-STRUCTURED MERGE TREE STORAGE

CROSS-REFERENCE TO RELATED APPLICATIONS

This application claims priority to and the benefit of U.S. Provisional Patent Application No. 63/397,176, filed Aug. 11, 2022, and entitled "SYSTEMS AND METHODS FOR BLOCK PROPERTY FILTERS TO ENABLE EFFICIENT READS IN LOG-STRUCTURED MERGE TREE STORAGE", the entirety of which is incorporated herein by reference.

FIELD OF TECHNOLOGY

The present disclosure relates generally to methods and systems for managing a distributed database and more particularly, to encoding and filtering data structures of the database using block properties.

BACKGROUND

The foregoing examples of the related art and limitations therewith are intended to be illustrative and not exclusive, and are not admitted to be "prior art." Other limitations of the related art will become apparent to those of skill in the art upon a reading of the specification and a study of the drawings. In some cases, relational databases can apply replication to ensure data survivability, where data is replicated among one or more computing devices ("nodes") of a group of computing devices ("cluster"). A relational database may store data within one or more ranges, where a range includes one or more key-value (KV) pairs and can be replicated among one or more nodes of the cluster. A range may be a partition of a data table ("table"), where a table may include one or more ranges. The database may receive requests (e.g., such as read or write operations originating from client devices) directed to data and/or schema objects stored by the database.

In some cases, log-structured merge (LSM) tree storage systems can be used to organize mutable (e.g., changeable) data in KV data stores and/or databases. An LSM tree may be a data structure stored by a non-volatile, persistent storage device at individual nodes of the cluster (e.g., each individual node of the cluster). An LSM tree can store data in immutable (e.g., unchangeable) data files containing one or more KV pairs, where the KV pairs can be sorted in key order. Each KV pair may include a key mapped to a respective value as described herein. The data files stored by LSM trees may be sorted string table files (also referred to herein as "sorted string tables", "sstables", "SSTs", and "SST files"). Properties of sstables can vary across popular LSM tree implementations, with common properties of sstables being inclusion of a number (e.g., series) of data blocks each including one or more KV pairs. In some cases, an sstable may include one or more layers (e.g., hierarchical layers). A series of second-level index blocks (also referred to as "secondary index blocks") included in the sstable may be layered above the series of data blocks, where each second-level index block includes a key per data block of the sstable that is mapped to the second-level index block. A single top-level index block (also referred to as a "primary index block") included in the sstable may be layered above the second-level index blocks, where the single top-level index block includes a key per second-level index block of the sstable. Such a hierarchical scheme for sstables can support efficient lookup of a particular string key and efficient scanning of keys and respective values in a particular key range. As an example, a key range may be defined by a range represented as [start-key-string, end-key-string), where "start-key-string" refers to a starting key of the range and "end-key-string" refers to an end key of the range.

In practice, KV data stores and databases that use LSM trees can have structured keys that are a tuple of attributes, where a tuple is a data structure that has a specific number and sequence of elements. For example, a relational database table can have a key that is a tuple of a student identifier (ID) and a course number (e.g., represented as a tuple of [student ID, course number]). Additionally, such KV data stores and databases can use multi-version concurrency control (MVCC) to maintain multiple versions of their table keys to support efficient transactional updates and queries over older versions of the table keys. To use an LSM tree storage system, KV data stores and databases can serialize multi-attribute key and version information into a string that is used as a string key of the LSM tree (and also a string key in an sstable). For example, for a database table having a key that is a tuple of a student ID, a course number, and key version (e.g., represented as the tuple of (StudentID42, Course245, Version3100)), the tuple would be serialized to a single string to form the key (e.g., represented as a key StudentID42Course245Version3100). A disadvantage of such serialization is an inefficiency to search or scan the data table using an attribute that is not a prefix of the string key. For example, a search cannot efficiently find keys for a particular course number or a particular range of MVCC versions due to the course number and MVCC version identifier being appended to the end of the student ID prefix. Accordingly, improved systems and methods are desired that enable efficient reads (e.g., searches and/or scans) based on properties of keys in an LSM tree storage system.

SUMMARY

Methods and systems for encoding block properties for data structures of a database and filtering data structures of a database using block properties are disclosed. In one aspect, embodiments of the present disclosure feature a method for encoding data stored by a data structure (e.g., a log-structured merge tree). According to one embodiment, the method can include executing operations on one or more processors of one or more servers. The operations can include adding a first group of a plurality of key-value entries to a first data block of a data file, wherein each of the plurality of key-value entries comprises a key and a value, wherein each of the plurality of key-value entries comprises a respective attribute. The operations can include determining, based on the attributes of the first group of the plurality of key-value entries, a first block property indicative of the respective attributes of the first group of the plurality of key-value entries of the first data block. The operations can include encoding the first block property in a first block handle, wherein the first block handle comprises an indication of a location of the first data block in the data file and an indication of a length of the first data block. The operations can include adding a first key-value entry to a secondary index block of the data file, wherein the secondary index block comprises one or more block properties comprising the first block property, wherein a key of the first key-value entry comprises a key of one of the first group of the plurality of key-value entries of the first data block, wherein the value of the first key-value entry comprises the first block handle.

Various embodiments of the method can include one or more of the following features. In some cases, the data file comprises a sorted strings table (sstable) file. Each attribute can provide an indication of a timestamp, version, or value of the respective key-value entry of the plurality of key-value entries. In some cases, the key of each key-value entry of the plurality of key-value entries comprises the respective attribute of the key-value entry. In some cases, the value of each key-value entry of the plurality of key-value entries comprises the respective attribute of the key-value entry. In some cases, the first data block comprises the first group of the plurality of key-value entries sorted by the respective keys of the first group of the plurality of key-value entries. In some cases, the data file comprises the plurality of key-value entries, wherein the keys of the plurality of key-value entries comprise a segment of a key space of permissible keys.

In some embodiments, the operations can further include determining the first data block has reached a maximum capacity; determining, based on (i) the attributes of the first group of the plurality of key-value entries and (ii) determining the first data block has reached the maximum capacity, the first block property indicative of the respective attributes of the first group of the plurality of key-value entries of the data block; and generating a second data block of the data file. In some cases, the secondary index block further comprises two or more block properties. The operations can further include adding a second group of the plurality of key-value entries to the second data block of the data file; determining, based on the attributes of the second group of the plurality of key-value entries, a second block property indicative of the respective attributes of the second group of the plurality of key-value entries of the second data block; encoding the second block property in a second block handle, wherein the second block handle comprises an indication of a location of the second data block in the data file and an indication of a length of the second data block; and adding a second key-value entry to the secondary index block, wherein the secondary index block comprises two or more block properties comprising the first block property and the second block property, wherein a key of the second key-value entry comprises a key of one of the second group of the plurality of key-value entries of the second data block, wherein the value of the second key-value entry comprises the second block handle.

In some embodiments, the operations can further include determining, based on the two or more block properties, a third block property indicative of the respective attributes of the first and second groups of the plurality of key-value entries; encoding the third block property in a third block handle, wherein the third block handle comprises an indication of a location of the secondary index block in the data file and an indication of a length of the secondary index block; and adding a third key-value entry to a primary index block of the data file, wherein the primary index block comprises one or more block properties comprising the third block property, wherein a key of the third key-value entry comprises a key of one of the key-value entries of the secondary index block, wherein the value of the third key-value entry comprises the third block handle. The operations can further include determining the secondary index block has reached a maximum capacity; determining, based on (i) the two or more block properties and (ii) determining the secondary index block has reached the maximum capacity, the third block property indicative of the respective attributes of the first and second groups of the plurality of key-value entries; and generating a second secondary index block of the data file. The operations can further include determining, based on adding the plurality of key-value entries to the data file, a table property indicative of the one or more block properties of the primary index block; and recording the table property as corresponding to the data file.

In another aspect, the present disclosure features a system for encoding data stored by a data structure (e.g., a log-structured merge tree). The system can include corresponding computer systems (e.g., servers), apparatus, and computer programs recorded on one or more computer storage devices, each configured to perform the actions of the method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

In another aspect, embodiments of the present disclosure feature a method for filtering data stored by a data structure (e.g., a log-structured merge tree). According to one embodiment, the method can include executing operations on one or more processors of one or more servers. The operations can include receiving, from a client device, a query directed to a database stored by a plurality of data files, wherein the query comprises a target block property comprising a type and value. The operations can include comparing a value of the target block property to a value of a first block property corresponding to a first data block comprised in a first data file of the plurality of data files, wherein the first data file comprises a plurality of key-value entries each comprising a key and a value, wherein the first data block comprises a first group of the plurality of key-value entries, wherein the first block property is indicative of the respective attributes of a first group of the plurality of key-value entries. The operations can include sending, when the target block property intersects with the first block property of the first data block, the values corresponding to the first group of the plurality of key-value entries of the first data block to the client device.

Various embodiments of the method can include one or more of the following features. In some cases, each data file of the plurality of data files comprises a sorted strings table (sstable) file. In some cases, each attribute provides an indication of a timestamp, version, or value of the respective key-value entry. In some cases, the value of the target block property comprises a timestamp interval. In some cases, each key of the plurality of key-value entries comprises the respective attribute. In some cases, each value of the plurality of key-value entries comprises the respective attribute. In some cases, the first data block comprises the first group of the plurality of key-value entries sorted by the respective keys of the first group of the plurality of key-value entries. In some cases, the first data file comprises the plurality of key-value entries, wherein the keys of the plurality of key-value entries comprise a segment of a key space of permissible keys.

In some embodiments, the operations can further include identifying the first data file of the plurality of data files; identifying one or more table properties corresponding to the first data file, wherein each of the one or more table properties is indicative of the one or more block properties of a primary index block; and comparing a type of a first table property of the one or more table properties to the type of the target block property. The operations can further include determining, based on comparing the type of the first table property to the type of the target block property, the type of the first table property of the one or more table properties does not correspond to the type of the target block property; and iterating, based on the query, through a plurality of data blocks of the first data file, wherein the plurality of data blocks comprise the first data block. The operations can further include determining, based on comparing the type of the first table property to the type of the target block property, the type of the first table property of the one or more table properties corresponds to the type of the target block property; and comparing a value of the first table property to the value of the target block property. The operations can further include determining, based on comparing the value of the first table property to the value of the target block property, the first table property and the target block property do not intersect; and identifying a second data file of the plurality of data files.

In some embodiments, the operations can further include determining, based on comparing the value of the first table property to the value of the target block property, the first table property and the target block property intersect; identifying a first key-value entry of the primary index block; decoding a second block property from a first block handle comprised in the first key-value entry of the primary index block, wherein the first block handle comprises an indication of a location of a secondary index block in the first data file and an indication of a length of the secondary index block; and comparing a value of the second block property to the value of the target block property. The operations can further include determining, based on comparing the value of the second block property to the value of the target block property, the second block property and the target block property do not intersect; and identifying a second key-value entry of the primary index block. The operations can further include sending, based on determining the second block property and the target block property do not intersect, a null value to the client device.

In some embodiments, the operations can further include determining, based on comparing the value of the second block property to the value of the target block property, the second block property and the target block property intersect; identifying a first key-value entry of the secondary index block; decoding the first block property from a second block handle comprised in a first key-value entry of the secondary index block, wherein the second block handle comprises an indication of a location of the first data block in the first data file and an indication of a length of the first data block; and comparing the value of the first block property to the value of the target block property. The operations can further include determining, based on comparing the value of the first block property to the value of the target block property, the first block property and the target block property do not intersect; and identifying a second key-value entry of the secondary index block. The operations can further include determining, based on comparing the value of the first block property to the value of the target block property, the first block property and the target block property intersect; identifying the first data block; and identifying the respective values corresponding to the first group of the plurality of key-value entries of the first data block.

In another aspect, the present disclosure features a system for filtering data stored by a data structure (e.g., a log-structured merge tree). The system can include corresponding computer systems (e.g., servers), apparatus, and computer programs recorded on one or more computer storage devices, each configured to perform the actions of the method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

The above and other preferred features, including various novel details of implementation and combination of events, will now be more particularly described with reference to the accompanying figures and pointed out in the claims. It will be understood that the particular methods and systems described herein are shown by way of illustration only and not as limitations. As will be understood by those skilled in the art, the principles and features described herein may be employed in various and numerous embodiments without departing from the scope of the present disclosure. As can be appreciated from foregoing and following description, each and every feature described herein, and each and every combination of two or more such features, is included within the scope of the present disclosure provided that the features included in such a combination are not mutually inconsistent. In addition, any feature or combination of features may be specifically excluded from any embodiment of the present disclosure.

The foregoing Summary, including the description of some embodiments, motivations therefore, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the generally description given above and the detailed description of the preferred embodiments given below serve to explain and teach the principles described herein.

Figure 1:
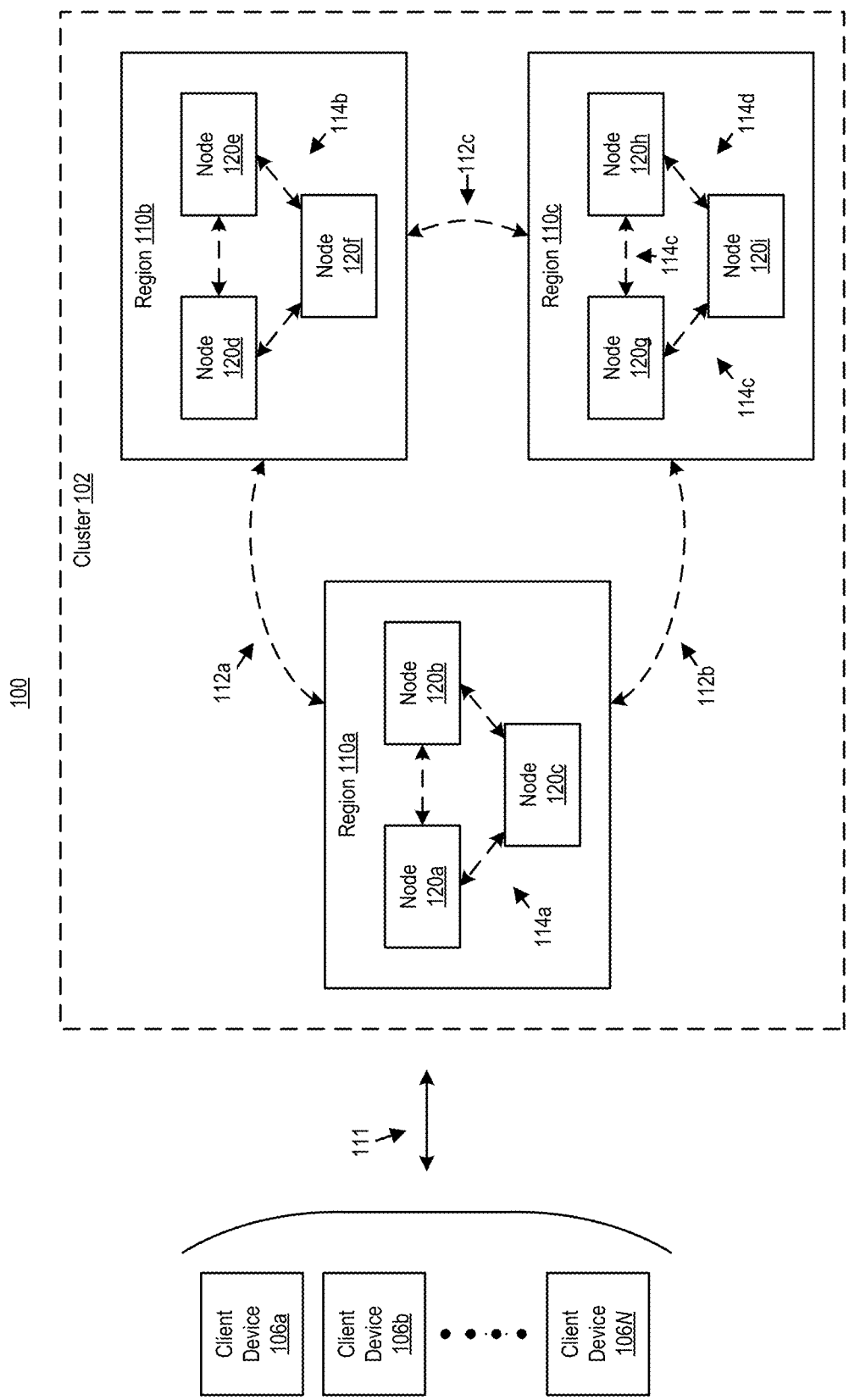
FIG. 1 shows an illustrative distributed computing system, according to some embodiments.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

Methods and systems for encoding block properties for data structures of a database and filtering data structures of a database using block properties are disclosed. It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details.

Motivation for Some Embodiments

As described above, conventional LSM tree storage systems do not have support for indexing individual attributes included in a multi-attribute key that is serialized to a string. Accordingly, queries can be required to scan the entire LSM tree to find the relevant data (e.g., the subject of the queries) when the queries are directed to ranges where the queried attribute is not a prefix of the key. Such queries are computationally intensive and inefficient, leading to increased latencies for the queries.

To partially compensate for this computationally inefficient scan, conventional LSM tree storage systems enable collection of coarse-grained properties of an sstable. Collection of the coarse-grained properties of an sstable can include collecting attribute values and/or a range of attribute values for the sstable, where attribute values for the sstable are included in the collected attribute values and/or range of attribute values. The collected attribute values can be identified used by a particular query to determine whether to further scan or ignore the sstable (e.g., index and data blocks included therein) at read time. However, given that sstables can be large (e.g., 64 megabytes (MB) or larger) and can contain millions of KV pairs, filtering sstables at an sstable-level granularity can be inefficient. Additionally, normal LSM reads become more efficient as a number of levels in the LSM tree are reduced (e.g., via compaction of data downward towards the lowest level of the LSM tree), but such level reduction can cause coarse-grained properties to become less effective as a larger amounts of data (e.g., and a wider range of keys) is added to an individual sstable.

Further, filtering at the granularity of an sstable can introduce a correctness problem, where certain operations that apply to a broad key range can be incorrectly filtered. As an example, range-delete operations (e.g., represented by a range-delete[start, end) operation) can delete all keys in a key interval defined as [start, end), where "start" refers to a starting key of the key interval and "end" refers to an end key of the key interval. Filtering sstables that have been subject to such range-delete operations may cause deleted keys to appear to be available (e.g., alive), which is incorrect.

The above-described limitations of a conventional sstable-level filtering scheme limit their applicability. Accordingly, block properties as described herein can be used by received queries to efficiently filter out keys that are outside the attribute value(s) and/or interval of attribute values that are of interest to a user and/or indicated in a received query. For example, block properties can be used by received queries to efficiently ignore irrelevant attributes (e.g., course numbers, MVCC versions, timestamps, etc.) that are outside of and/or otherwise not included in the relevant key range. Use of block properties can increase efficiency of queries directed to a database system including LSM storage and can streamline internal system management operations. As an example, for a keys having respective versions within a first version number V1 and a second version number V2, incremental backups for keys having respective versions within an interval defined as $(V_1, V_2]$ may be used for backup operations, where keys having respective versions less than or equal to $V_1$ have been previously backed up.

Terms

"Cluster" generally refers to a deployment of computing devices that comprise a database. A cluster may include computing devices (e.g., computing nodes) that are located in one or more geographic locations (e.g., data centers). The one or more geographic locations may be located within a single geographic region (e.g., eastern United States, central United States, etc.) or more than one geographic location. For example, a cluster may include computing devices that are located in both the eastern United States and western United States, with 2 data centers in the eastern United states and 4 data centers in the western United States.

"Node" generally refers to an individual computing device that is a part of a cluster. A node may join with one or more other nodes to form a cluster. One or nodes that comprise a cluster may store data (e.g., tables, indexes, etc.) in a map of KV pairs. A node may store a "range", which can be a subset of the KV pairs (or all of the KV pairs depending on the size of the range) stored by the cluster. A range may also be referred to as a "shard" and/or a "partition". A table and its secondary indexes can be mapped to one or more ranges, where each KV pair in a range may represent a single row in the table (which can also be referred to as the primary index because the table is sorted by the primary key) or a single row in a secondary index. Based on the range reaching or exceeding a threshold storage size, the range may split into two ranges. For example, based on reaching 512 mebibytes (MiB) in size, the range may split into two ranges. Successive ranges may split into one or more ranges based on reaching or exceeding a threshold storage size.

"Index" generally refers to a copy of the rows corresponding to a single table, where the rows are sorted by one or more columns (e.g., a column or a set of columns) of the table. Each index may correspond and/or otherwise belong to a single table. In some cases, an index may include a type. An example of a first type of index may be a primary index.

A primary index may be an index on row-identifying primary key columns. A primary key constraint may be applied to one or more columns of a table to uniquely identify each row of the table, such that the primary key adds structure to table data. For a column configured with a primary key constraint, values stored in the column(s) must uniquely identify each row. One or more columns of a table may be configured with a primary key constraint and the database that includes the table may automatically create an index (referred to as a primary index) for the primary key column(s). A primary key may be defined for each table stored by a database as described herein. An example of a second type of index may be a secondary index. A secondary index may be defined on non-primary key columns of a table. A table that does not include a defined primary index may include a hidden row identifier (ID) (e.g., referred to as rowid) column that uniquely identifies each row of the table as an implicit primary index.

"Replica" generally refers to a copy of a range. A range may be replicated at least a threshold number of times to produce a number of replicas. For example and by default, a range may be replicated 3 times as 3 distinct replicas. Each replica of a range may be stored on a distinct node of a cluster. For example, 3 replicas of a range may each be stored on a different node of a cluster. In some cases, a range may be required to be replicated a minimum of 3 times to produce at least 3 replicas.

"Leaseholder" or "leaseholder replica" generally refers to a replica of a range that is configured to hold the lease for the replicas of the range. The leaseholder may receive and/or coordinate read transactions and write transactions directed to one or more KV pairs stored by the range. "Leaseholder node" may generally refer to the node of the cluster that stores the leaseholder replica. The leaseholder may receive read transactions and serve reads to client devices indicated by the read transactions. Other replicas of the range that are not the leaseholder may receive read transactions and route the read transactions to the leaseholder, such that the leaseholder can serve the read based on the read transaction.

"Raft leader" or "leader" generally refers to a replica of the range that is a leader for managing write transactions for a range. In some cases, the leader and the leaseholder are the same replica for a range (e.g., leader is inclusive of leaseholder and/or leaseholder is inclusive of leader). In other cases, the leader and the leaseholder are not the same replica for a range. "Raft leader node" or "leader node" generally refers to a node of the cluster that stores the leader. The leader may determine that a threshold number of the replicas of a range agree to commit a write transaction prior to committing the write transaction. In some cases, the threshold number of the replicas of the range may be a majority of the replicas of the range.

"Follower" generally refers to a replica of the range that is not the leader. "Follower node" may generally refer to a node of the cluster that stores the follower replica. Follower replicas may receive write transactions from the leader replica. The leader replica and the follower replicas of a range may constitute voting replicas that participate in a distributed consensus protocol and included operations (also referred to as "Raft protocol" and "Raft operations" as described herein.

"Raft log" generally refers to a time-ordered log of write transactions to a range, where the log of write transactions includes write transactions agreed to by a threshold number of the replicas of the range. Each replica of a range may include a raft log stored on the node that stores the replica. The leader replica and the follower replicas of a range may constitute voting replicas that participate in a distributed consensus protocol and included operations (also referred to as "Raft protocol" and "Raft operations" as described herein). A raft log for a replica may be stored on persistent storage (e.g., non-volatile storage such as disk storage, solid state drive (SSD) storage, etc.). A raft log may be a source of truth for replication among nodes for a range.

"Consistency" generally refers to causality and the ordering of transactions within a distributed system. Consistency defines rules for operations within the distributed system, such that data stored by the system will remain consistent with respect to read and write operations originating from different sources.

"Consensus" generally refers to a threshold number of replicas for a range, based on receiving a write transaction, acknowledging a write transaction. In some cases, the threshold number of replicas may be a majority of replicas for a range. Consensus may be achieved even if one or more nodes storing replicas of a range are offline, such that the threshold number of replicas for the range can acknowledge the write transaction. Based on achieving consensus, data modified by the write transaction may be stored within the range(s) targeted by the write transaction.

"Replication" generally refers to creating and distributing copies (e.g., replicas) of the data stored by the cluster. In some cases, replication can ensure that replicas of a range remain consistent among the nodes that each comprise a replica of the range. In some cases, replication may be synchronous such that write transactions are acknowledged and/or otherwise propagated to a threshold number of replicas of a range before being considered committed to the range.

Database Overview

A database stored by a cluster of nodes may operate based on one or more remote procedure calls (RPCs). The database may be comprised of a KV store distributed among the nodes of the cluster. In some cases, the RPCs may be SQL RPCs. In other cases, RPCs based on other programming languages may be used. Nodes of the cluster may receive SQL RPCs from client devices. After receiving SQL RPCs, nodes may convert the SQL RPCs into operations that may operate on the distributed KV store.

In some embodiments, as described herein, the KV store of the database may be comprised of one or more ranges. A range may be a selected storage size. For example, a range may be 512 MiB. Each range may be replicated to more than one node to maintain data survivability. For example, each range may be replicated to at least 3 nodes. By replicating each range to more than one node, if a node fails, replica(s) of the range would still exist on and be available on other nodes such that the range can still be accessed by client devices and replicated to other nodes of the cluster.

In some embodiments, operations directed to KV data as described herein may be executed by one or more transactions. In some cases, a node may receive a read transaction from a client device. A node may receive a write transaction from a client device. In some cases, a node can receive a read transaction or a write transaction from another node of the cluster. For example, a leaseholder node may receive a read transaction from a node that originally received the read transaction from a client device. In some cases, a node can send a read transaction to another node of the cluster. For example, a node that received a read transaction, but cannot serve the read transaction may send the read transaction to the leaseholder node. In some cases, if a node receives a read or write transaction that it cannot directly serve, the node may send and/or otherwise route the transaction to the node that can serve the transaction.

In some embodiments, modifications to the data of a range may rely on a consensus protocol to ensure a threshold number of replicas of the range agree to commit the change. The threshold may be a majority of the replicas of the range. The consensus protocol may enable consistent reads of data stored by a range.

In some embodiments, data may be written to and/or read from a storage device of a node using a storage engine that tracks the timestamp associated with the data. By tracking the timestamp associated with the data, client devices may query for historical data from a specific period of time (e.g., at a specific timestamp). A timestamp associated with a key corresponding to KV data may be assigned by a gateway node that received the transaction that wrote and/or otherwise modified the key. For a transaction that wrote and/or modified the respective key, the gateway node (e.g., the node that initially receives a transaction) may determine and assign a timestamp to the transaction based on time of a clock of the node (e.g., at the timestamp indicated by the clock when the transaction was received by the gateway node). The transaction may assign the timestamp to the KVs that are subject to the transaction. Timestamps may enable tracking of versions of KVs (e.g., through multi-version concurrency control (MVCC) as to be described herein) and may provide guaranteed transactional isolation. In some cases, additional or alternative methods may be used to assign versions and/or timestamps to keys and respective values.

In some embodiments, a "table descriptor" may correspond to each table of the database, where the table descriptor may contain the schema of the table and may include information associated with the table. Each table descriptor may be stored in a "descriptor table", where each version of a table descriptor may be accessed by nodes of a cluster. In some cases, a "descriptor" may correspond to any suitable schema or subset of a schema, where the descriptor may contain the schema or the subset of the schema and may include information associated with the schema (e.g., a state of the schema). Examples of a descriptor may include a table descriptor, type descriptor, database descriptor, and schema descriptor. A view and/or a sequence as described herein may correspond to a table descriptor. Each descriptor may be stored by nodes of a cluster in a normalized or a denormalized form. Each descriptor may be stored in a KV store by nodes of a cluster. In some embodiments, the contents of a descriptor may be encoded as rows in a database (e.g., SQL database) stored by nodes of a cluster. Descriptions for a table descriptor corresponding to a table may be adapted for any suitable descriptor corresponding to any suitable schema (e.g., user-defined schema) or schema element as described herein. In some cases, a database descriptor of a database may include indications of a primary region and one or more other database regions configured for the database.

In some embodiments, database architecture for the cluster of nodes may be comprised of one or more layers. The one or more layers may process received SQL RPCs into actionable processes to access, modify, store, and return data to client devices, while providing for data replication and consistency among nodes of a cluster. The layers may comprise one or more of: a SQL layer, a transactional layer, a distribution layer, a replication layer, and a storage layer.

In some cases, the SQL layer of the database architecture exposes a SQL application programming interface (API) to developers and converts high-level SQL statements into low-level read and write requests to the underlying KV store, which are passed to the transaction layer. The transaction layer of the database architecture can implement support for atomic, consistent, isolated, and durable (ACID) transactions by coordinating concurrent operations. The distribution layer of the database architecture can provide a unified view of a cluster's data. The replication layer of the database architecture can copy data between nodes and ensure consistency between these copies by implementing a consensus algorithm. The storage layer may commit writes from the Raft log to disk (e.g., a computer-readable storage medium on a node), as well as return requested data (e.g., read data) to the replication layer.

Database Architecture

Referring to FIG. 1, an illustrative distributed computing system 100 is presented. The computing system 100 may include a cluster 102. In some cases, the computing system may include one or more additional clusters 102. The cluster 102 may include one or more nodes 120 distributed among one or more geographic regions 110. The geographic regions may correspond to cluster regions and database regions as described further below. A node 120 may be a computing device. In some cases, a node 120 may include at least portions of the computing system as described herein with respect to FIG. 9. As an example, a node 120 may be a server computing device. A region 110 may correspond to a particular building (e.g., a data center), city, state/province, country, geographic region, and/or a subset of any one of the above. A region 110 may include multiple elements, such as a country and a geographic identifier for the country. For example, a region 110 may be indicated by Country=United States and Region=Central, which may indicate a region 110 as the Central United States. As shown in FIG. 1, the cluster 102 may include regions 110a, 110b, and 110c. In some cases, the cluster 102 may include one region 110. In an example, the region 110a may be the Eastern United States, the region 110b may be the Central United States, and the region 110c may be the Western United States. Each region 110 of the cluster 102 may include one or more nodes 120. In some cases, a region 110 may not include any nodes 120. The region 110a may include nodes 120a, 120b, and 120c. The region 110b may include the nodes 120d, 120e, and 120f. The region 110c may include nodes 120g, 120h, and 120i.

Each node 120 of the cluster 102 may be communicatively coupled via one or more networks 112 and 114. In some cases, the cluster 102 may include networks 112a, 112b, and 112c, as well as networks 114a, 114b, 114c, and 114d. The networks 112 may include a local area network (LAN), wide area network (WAN), and/or any other suitable network. In some cases, the one or more networks 112 may connect nodes 120 of different regions 110. The nodes 120 of region 110a may be connected to the nodes 120 of region 110b via a network 112a. The nodes 120 of region 110a may be connected to the nodes 120 of region 110c via a network 112b. The nodes 120 of region 110b may be connected to the nodes 120 of region 110c via a network 112c. The networks 114 may include a LAN, WAN, and/or any other suitable network. In some cases, the networks 114 may connect nodes 120 within a region 110. The nodes 120a, 120b, and 120c of the region 110a may be interconnected via a network 114a. The nodes 120d, 120e, and 120f of the region 110b may be interconnected via a network 114b. In some cases, the nodes 120 within a region 110 may be connected via one or more different networks 114. The node 120g of the region 110c may be connected to nodes 120h and 120i via a network 114c, while nodes 120h and 120i may be connected via a network 114d. In some cases, the nodes 120 of a region 110 may be located in different geographic locations within the region 110. For example, if region 110a is the Eastern United States, nodes 120a and 120b may be located in New York, while node 120c may be located in Massachusetts.

In some embodiments, the computing system 100 may include one or more client devices 106. The one or more client devices 106 may include one or more computing devices. In some cases, the one or more client devices 106 may each include at least portions of the computing system as described herein with respect to FIG. 9. In an example, the one or more client devices 106 may include laptop computing devices, desktop computing devices, mobile computing devices, tablet computing devices, and/or server computing device. As shown in FIG. 1, the computing system 100 may include client devices 106a, 106b, and one or more client devices 106 up to client device 106N, where N is any suitable number of client devices 106 included in the computing system 100. The client devices 106 may be communicatively coupled to the cluster 102, such that the client devices 106 may access and/or otherwise communicate with the nodes 120. One or more networks 111 may couple the client devices 106 the nodes 120. The one or more networks 111 may include a LAN, a WAN, and/or any other suitable network as described herein. As an example, the client devices 106 may communicate with the nodes 120 via a SQL client operating at each respective client device 106. To access and/or otherwise interact with the data stored by the cluster 102, a client device 106 may communicate with a gateway node, which may be a node 120 of the cluster that is closest (e.g., by latency, geographic proximity, and/or any other suitable indication of closeness) to the client device 106. The gateway node may route communications between a client device 106 and any other node 120 of the cluster.

Transaction Execution

In some embodiments, as described herein, distributed transactional databases stored by the cluster of nodes may enable one or more transactions. Each transaction may include one or more requests (e.g., queries) directed to performing one or more operations. In some cases, a request may be a query (e.g., a SQL query). A request may traverse one or more nodes of a cluster to execute the request. A request may interact with (e.g., sequentially interact with) one or more of the following: a SQL client, a load balancer, a gateway, a leaseholder, and/or a Raft Leader as described herein. A SQL client may send a request (e.g., query) to a cluster. The request may be included in a transaction, where the transaction is a read and/or a write transaction as described herein. A load balancer may route the request from the SQL client to the nodes of the cluster. A gateway node may be a node that initially receives the request and/or sends a response to the SQL client. A leaseholder may be a node that serves reads and coordinates writes for a range of keys (e.g., keys indicated in the request) as described herein. A Raft leader may be a node that maintains consensus among the replicas for a range.

A SQL client (e.g., operating at a client device 106a) may send a request (e.g., a SQL request) to a cluster (e.g., cluster 102). The request may be sent over a network (e.g., the network 111). A load balancer may determine a node of the cluster to which to send the request. The node may be a node of the cluster having the lowest latency and/or having the closest geographic location to the computing device on which the SQL client is operating. A gateway node (e.g., node 120a) may receive the request from the load balancer. The gateway node may parse the request to determine whether the request is valid. The request may be valid based on conforming to the syntax (e.g., SQL syntax) of the database(s) stored by the cluster. An optimizer operating at the gateway node may generate a number of logically equivalent query plans plan based on the received request. Each query plan may correspond to a physical operation tree configured to be executed for the query. The optimizer may select an optimal query plan from the number of query plans (e.g., based on a cost model). Based on the completion of request planning, a query execution engine may execute the selected, optimal query plan using a transaction coordinator as described herein. A transaction coordinator operating on a gateway node may perform one or more operations as a part of the transaction layer. The transaction coordinator may perform KV operations on a database stored by the cluster. The transaction coordinator may account for keys indicated and/or otherwise involved in a transaction. The transaction coordinator may package KV operations into a Batch Request as described herein, where the Batch Request may be forwarded on to a Distribution Sender (DistSender) operating on the gateway node.

A DistSender of a gateway node and/or coordinating node may receive Batch Requests from a transaction coordinator of the same node. The DistSender of the gateway node may receive the Batch Request from the transaction coordinator. The DistSender may determine the operations indicated by the Batch Request and may determine the node(s) (i.e. the leaseholder node(s)) that should receive requests corresponding to the operations for the range. The DistSender may generate one or more Batch Requests based on determining the operations and the node(s) as described herein. The DistSender may send a first Batch Request for each range in parallel. Based on receiving a provisional acknowledgment from a leaseholder node's evaluator, the DistSender may send the next Batch Request for the range corresponding to the provisional acknowledgement. The DistSender may wait to receive acknowledgments for write operations and values for read operations corresponding to the sent Batch Requests.

As described herein, the DistSender of the gateway node may send Batch Requests to leaseholders (or other replicas) for data indicated by the Batch Request. In some cases, the DistSender may send Batch Requests to nodes that are not the leaseholder for the range (e.g., based on out of date leaseholder information). Nodes may or may not store the replica indicated by the Batch Request. Nodes may respond to a Batch Request with one or more responses. A response may indicate the node is no longer a leaseholder for the range. The response may indicate the last known address of the leaseholder for the range. A response may indicate the node does not include a replica for the range. A response may indicate the Batch Request was successful if the node that received the Batch Request is the leaseholder. The leaseholder may process the Batch Request. As a part of processing of the Batch Request, each write operation in the Batch Request may compare a timestamp of the write operation to the timestamp cache. A timestamp cache may track the highest timestamp (i.e., most recent timestamp) for any read operation that a given range has served. The comparison may ensure that the write operation has a higher timestamp than any timestamp indicated by the timestamp cache. If a write operation has a lower timestamp than any timestamp indicated by the timestamp cache, the write operation may be restarted at an advanced timestamp that is greater than the value of the most recent timestamp indicated by the timestamp cache.

In some embodiments, operations indicated in the Batch Request may be serialized by a latch manager of a leaseholder. For serialization, each write operation may be given a latch on a row. Any read and/or write operations that arrive after the latch has been granted on the row may be required to wait for the write operation to complete. Based on completion of the write operation, the latch may be released and the subsequent operations can proceed to execute. In some cases, a batch evaluator may ensure that write operations are valid. The batch evaluator may determine whether the write operation is valid based on the leaseholder's data. The leaseholder's data may be evaluated by the batch evaluator based on the leaseholder coordinating write operations to the range. If the batch evaluator determines the write operation to be valid, the leaseholder may send a provisional acknowledgement to the DistSender of the gateway node, such that the DistSender may begin to send subsequent Batch Requests for the range to the leaseholder.

In some embodiments, operations may read from the local instance of the storage engine as described herein to determine whether write intents are present at a key. If write intents are present at a particular key, an operation may resolve write intents as described herein. If the operation is a read operation and write intents are not present at the key, the read operation may read the value at the key of the leaseholder's storage engine. Read responses corresponding to a transaction may be aggregated into a Batch Response by the leaseholder. The Batch Response may be sent to the DistSender of the gateway node. If the operation is a write operation and write intents are not present at the key, the KV operations included in the Batch Request that correspond to the write operation may be converted to Raft (i.e. distributed consensus) operations and write intents, such that the write operation may be replicated to the replicas of the range.

With respect to a single round of distributed consensus, the leaseholder may propose the Raft operations to the leader replica of the Raft group (e.g., where the leader replica is typically also the leaseholder). Based on receiving the Raft operations, the leader replica may send the Raft operations to the follower replicas of the Raft group. Writing and/or execution of Raft operations as described herein may include writing one or more write intents to persistent storage. The leader replica and the follower replicas may attempt to write the Raft operations to their respective Raft logs. When a particular replica writes the Raft operations to its respective local Raft log, the replica may acknowledge success of the Raft operations by sending an indication of a success of writing the Raft operations to the leader replica. If a threshold number of the replicas acknowledge writing the Raft operations (e.g., the write operations) to their respective Raft log, consensus may be achieved such that the Raft operations may be committed (referred to as "consensus-committed" or "consensus-commit"). The consensus-commit may be achieved for a particular Raft operation when a majority of the replicas (e.g., including or not including the leader replica) have written the Raft operation to their local Raft log. The consensus-commit may be discovered or otherwise known to the leader replica to be committed when a majority of the replicas have sent an indication of success for the Raft operation to the leader replica. Based on a Raft operation (e.g., write operation) being consensus-committed among a Raft group, each replica included in the Raft group may apply the committed entry to their respective local state machine. Based on achieving consensus-commit among the Raft group, the Raft operations (e.g., write operations included in the write transaction) may be considered to be committed (e.g., implicitly committed as described herein). The gateway node may update the status of the transaction record for the transaction corresponding to the Raft operations to committed (e.g., explicitly committed as described herein). A latency for the above-described distributed consensus round may be equivalent to a duration for sending a Raft operation from the leader replica to the follower replicas, receiving success responses for the Raft operation at the leader replica from at least some of the follower replicas (e.g., such that a majority of replicas write to their respective Raft log), and writing a write intent to persistent storage at the leader and follower replicas in parallel.

In some embodiments, based on the leader replica writing the Raft operations to the Raft log and receiving an indication of the consensus-commit among the Raft group, the leader replica may send a commit acknowledgement to the DistSender of the gateway node. The DistSender of the gateway node may aggregate commit acknowledgements from each write operation included in the Batch Request. In some cases, the DistSender of the gateway node may aggregate read values for each read operation included in the Batch Request. Based on completion of the operations of the Batch Request, the DistSender may record the success of each transaction in a corresponding transaction record. To record the success of a transaction, the DistSender may check the timestamp cache of the range where the first operation of the write transaction occurred to determine whether the timestamp for the write transaction was advanced. If the timestamp was advanced, the transaction may perform a read refresh to determine whether values associated with the transaction had changed. If the read refresh is successful (e.g., no values associated with the transaction had changed), the transaction may commit at the advanced timestamp. If the read refresh fails (e.g., at least some value associated with the transaction had changed), the transaction may be restarted. Based on determining the read refresh was successful and/or that the timestamp was not advanced for a write transaction, the DistSender may change the status of the corresponding transaction record to committed as described herein. The DistSender may send values (e.g., read values) to the transaction coordinator. The transaction coordinator may send the values to the SQL layer. In some cases, the transaction coordinator may also send a request to the DistSender, where the request includes an indication for the DistSender to convert write intents to committed values (e.g., MVCC values). The SQL layer may send the values as described herein to the SQL client that initiated the query (e.g., operating on a client device).

Read Transaction Execution

Figure 2A:
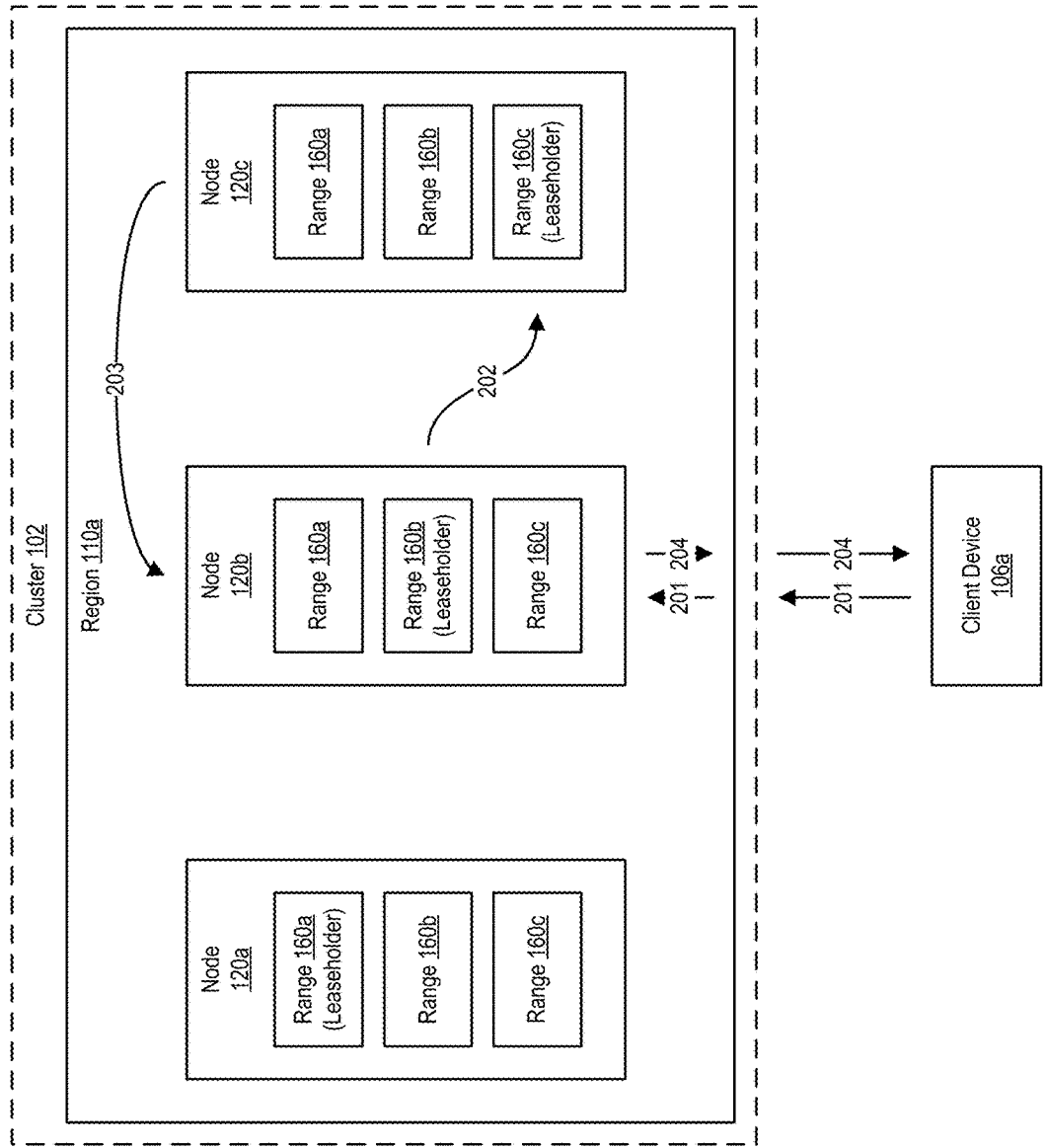
FIG. 2A shows an example of execution of a read transaction at the computing system, according to some embodiments.

Referring to FIG. 2A, an example of execution of a read transaction at the computing system 100 is presented. In some cases, the nodes 120*a*, 120*b*, and 120*c*, of region 110*a* may include one or more replicas of ranges 160. The node 120*a* may include replicas of ranges 160*a*, 160*b*, and 160*c*, where ranges 160*a*, 160*b*, and 160*c* are different ranges. The node 120*a* may include the leaseholder replica for range 160*a* (as indicated by "Leaseholder" in FIG. 2A). The node 120*b* may include replicas of ranges 160*a*, 160*b*, and 160*c*. The node 120*b* may include the leaseholder replica for range 160*b* (as indicated by "Leaseholder" in FIG. 2A). The node 120*c* may include replicas of ranges 160*a*, 160*b*, and 160*c*. The node 120*c* may include the leaseholder replica for range 160*c* (as indicated by "Leaseholder" in FIG. 2A). While FIG. 2A is described with respect to communication between nodes 120 of a single region (e.g., region 110*a*), a read transaction may operate similarly between nodes 120 located within different geographic regions.

In some embodiments, a client device 106 may initiate a read transaction at a node 120 of the cluster 102. Based on the KVs indicated by the read transaction, the node 120 that initially receives the read transaction (e.g., the gateway node) from the client device 106 may route the read transaction to a leaseholder of the range 160 comprising the KVs indicated by the read transaction. The leaseholder of the range 160 may serve the read transaction and send the read data to the gateway node. The gateway node may send the read data to the client device 106.

As shown in FIG. 2A, at step 201, the client device 106 may send a read transaction to the cluster 102. The read transaction may be received by node 120*b* as the gateway node. The node 120*b* may be a node 120 located closest to the client device 106, where the closeness between the nodes 120 and a client device 106 may correspond to a latency and/or a proximity as described herein. The read transaction may be directed to data stored by the range 160*c*. At step 202, the node 120*b* may route the received read transaction to node 120*c*. The read transaction may be routed to node 120*c* based on the node 120*c* being the leaseholder of the range 160*c*. The node 120*c* may receive the read transaction from node 120*b* and serve the read transaction from the range 160*c*. At step 203, the node 120*c* may send the read data to the node 120*b*. The node 120*c* may send the read data to node 120*b* based on the node 120*b* being the gateway node for the read transaction. The node 120*b* may receive the read data from node 120*c*. At step 204, the node 120*b* may send the read data to the client device 106*a* to complete the read transaction. If node 120*b* had been configured to include the leaseholder for the range 160*c*, the node 120*b* may have served the read data to the client device directly after step 201, without routing the read transaction to the node 120*c*.

Write Transaction Execution

Figure 2B:
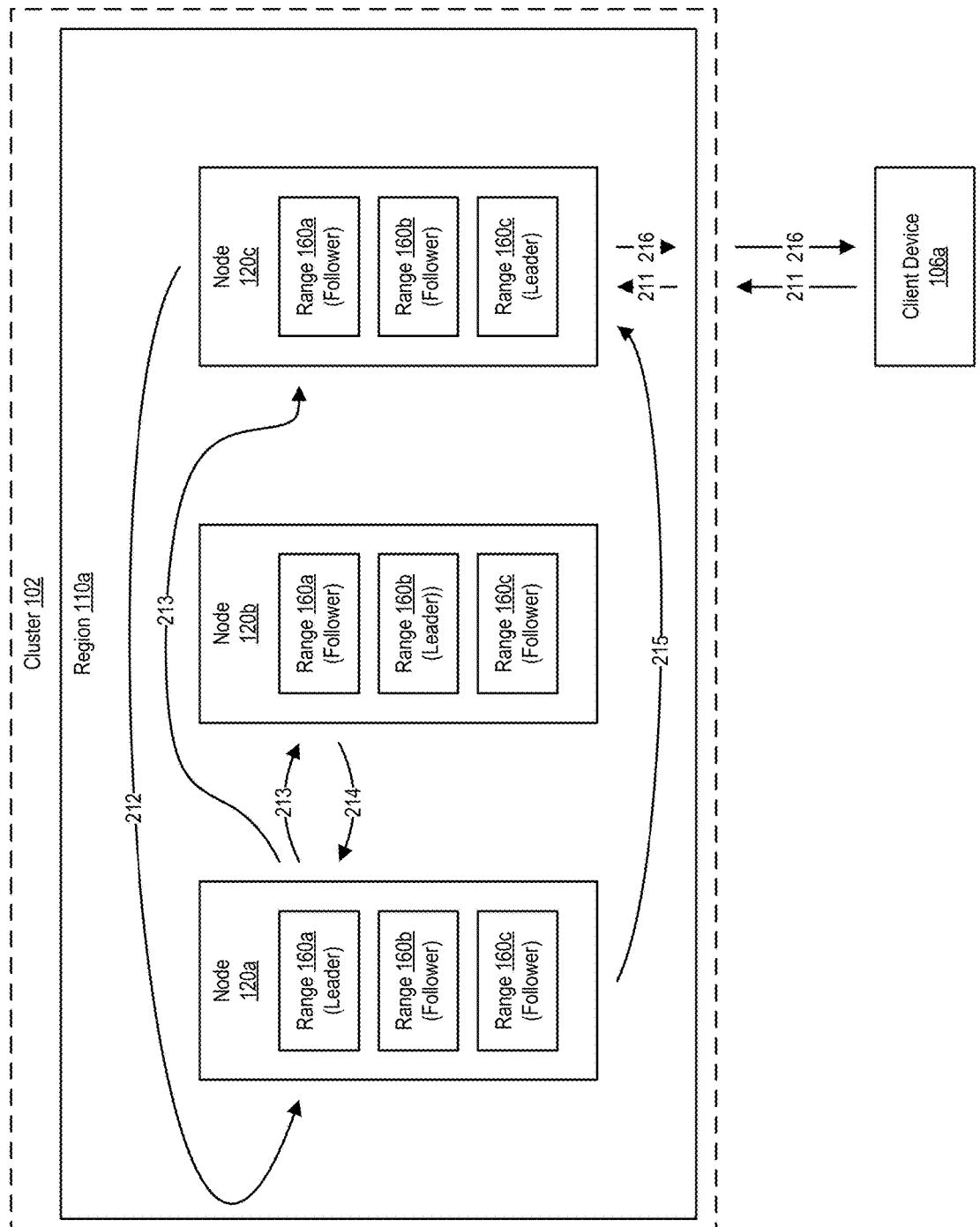
FIG. 2B shows an example of execution of a write transaction at the computing system, according to some embodiments.

Referring to FIG. 2B, an example of execution of a write transaction at the computing system 100 is presented. In some cases, as described herein, the nodes 120*a*, 120*b*, and 120*c*, of region 110*a* may include one or more replicas of ranges 160. The node 120*a* may include replicas of ranges 160*a*, 160*b*, and 160*c*, where ranges 160*a*, 160*b*, and 160*c* are different ranges. The node 120*a* may include the leaseholder replica and the leader replica for range 160*a* (as indicated by "Leaseholder" in FIG. 2A and "Leader" in FIG. 2B). The node 120*b* may include replicas of ranges 160*a*, 160*b*, and 160*c*. The node 120*b* may include the leader replica for range 160*b* (as indicated by "Leader" in FIG. 2B). The node 120*c* may include replicas of ranges 160*a*, 160*b*, and 160*c*. The node 120*c* may include the leader replica for range 160*c* (as indicated by "Leader" in FIG. 2B). While FIG. 2B is described with respect to communication between nodes 120 of a single region (e.g., region 110*a*), a write transaction may operate similarly between nodes 120 located within different geographic regions.

In some embodiments, a client device 106 may initiate a write transaction at a node 120 of the cluster 102. Based on the KVs indicated by the write transaction, the node 120 that initially receives the write transaction (e.g., the gateway node) from the client device 106 may route the write transaction to a leaseholder of the range 160 comprising the KVs indicated by the write transaction. The leaseholder of the range 160 may route the write request to the leader replica of the range 160. In most cases, the leaseholder of the range 160 and the leader replica of the range 160 are the same. The leader replica may append the write transaction to a Raft log of the leader replica and may send the write transaction to the corresponding follower replicas of the range 160 for replication. Follower replicas of the range may append the write transaction to their corresponding Raft logs and send an indication to the leader replica that the write transaction was appended. Based on a threshold number (e.g., a majority) of the replicas indicating and/or sending an indication to the leader replica that the write transaction was appended, the write transaction may be committed by the leader replica. The leader replica may send an indication to the follower replicas to commit the write transaction. The leader replica may send an acknowledgement of a commit of the write transaction to the gateway node. The gateway node may send the acknowledgement to the client device 106.

As shown in FIG. 2B, at step 211, the client device 106 may send a write transaction to the cluster 102. The write transaction may be received by node 120*c* as the gateway node. The write transaction may be directed to data stored by the range 160*a*. At step 212, the node 120*c* may route the received write transaction to node 120*a*. The write transaction may be routed to node 120*a* based on the node 120*a* being the leaseholder of the range 160*a*. Based on the node 120*a* including the leader replica for the range 160*a*, the leader replica of range 160*a* may append the write transaction to a Raft log at node 120*a*. At step 213, the leader replica may simultaneously send the write transaction to the follower replicas of range 160*a* on the node 120*b* and the node 120*c*. The node 120*b* and the node 120*c* may append the write transaction to their respective Raft logs. At step 214, the follower replicas of the range 160*a* (at nodes 120*b* and 120*c*) may send an indication to the leader replica of the range 160*a* that the write transaction was appended to their Raft logs. Based on a threshold number of replicas indicating the write transaction was appended to their Raft logs, the leader replica and follower replicas of the range 160*a* may commit the write transaction. At step 215, the node 120*a* may send an acknowledgement of the committed write transaction to the node 120*c*. At step 216, the node 120*c* may send the acknowledgement of the committed write transaction to the client device 106*a* to complete the write transaction.

Storage Layer

In some cases, a storage layer as described herein may be an embedded KV store. The storage layer may enable the cluster to read and write data to storage device(s) of each node. As described herein, data may be stored as KV pairs on the storage device(s) using a storage engine. The storage layer may provide atomic write batches and snapshots, which can indicate a subset of transactions. The storage layer may use an LSM tree at each node of the cluster to manage data storage. In some cases, the LSM tree is a hierarchical tree including a number of levels. For each level of the LSM tree, one or more files may be stored on persistent storage media (e.g., disk storage, solid state drive (SSD) storage, etc.) that include the data referenced at that respective level. The files may be sorted string table files as described herein. In some cases, sstables are an on-disk (e.g., on persistent, non-volatile storage such as disk storage, SSD storage, etc.) representation of sorted lists of KV pairs. Sstables can be immutable, such that they are never modified (e.g., even during a compaction process) and instead are deleted and written.

Figure 3:
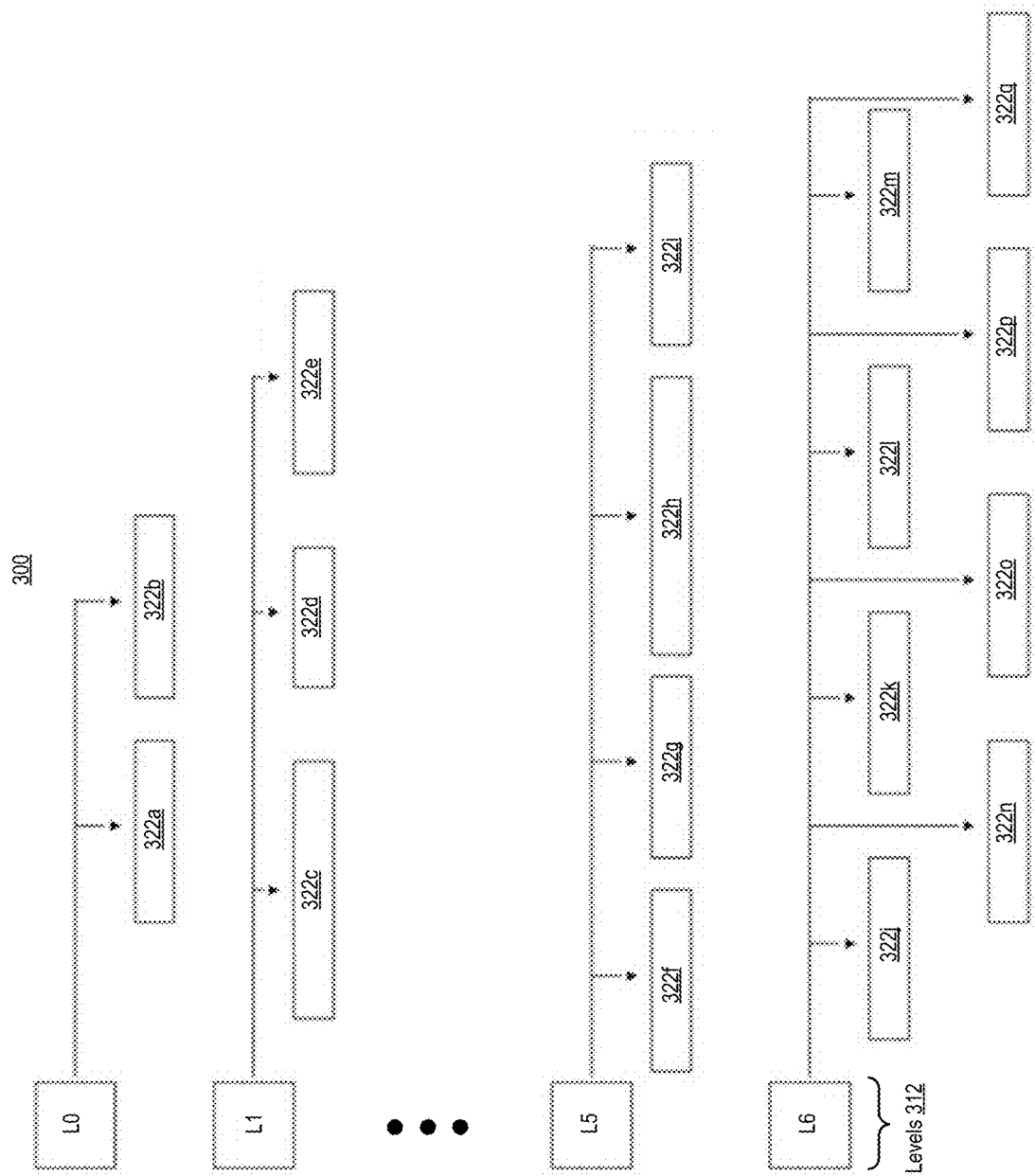
FIG. 3 shows an exemplary illustration of a log-structured merge (LSM) tree of a computing system, according to some embodiments.

In some cases, levels of the LSM tree can be organized in descending order from level 0 (L0) to level 6 (L6), where L0 is the top-most level and L6 is the bottom-most level. New data can be added into L0 (e.g., using insert or import operations) and then transferred downward into lower levels of the LSM tree over time. FIG. 3 shows an exemplary illustration 300 of an LSM tree. The LSM tree shown in the illustration 300 include a number of levels 312, including L0, L1, level 2 (L2) (not shown), level 3 (L3) (not shown), level 4 (L4) (not shown), level 5 (L5), and L6. Each level of an LSM tree can be associated with a set of sstables 322 spanning a key space of permissible key-values, where each sstable 322: (i) includes a segment of the key space, (ii) is immutable, and (iii) has a unique identifier (e.g., a monotonically increasing number). As shown in FIG. 3, the L0 may include sstables 322*a* and 322*b*. L1 may include sstables 322*c*, 322*e*, and 322*e*. L5 may include sstables 322*f*, 322*g*, 322*h*, and 322*i*. L6 may include sstables 322*j*, 322*k*, 322*l*, 322*m*, 322*n*, 322*o*, 322*p*, and 322*q*. While the levels 312 of the LSM tree shown and described with respect to FIG. 3 are described as including an exemplary number of sstables, each of the levels 312 may include any suitable number of sstables 322. In some cases, the sstables 322 within some of the levels 312 may be non-overlapping, such that a segment of a key space corresponding to a first sstable 322 in a particular level (e.g., L1) does not overlap with a segment of the key space corresponding to a second sstable 322 in the same level. For example, if a first sstable of L1 includes a segment of the key space for the keys [A-F] (non-inclusive), a second sstable of L1 will contain a segment of the key space for keys [F-R], and so on. The L0 level may be an exception to such non-overlapping and may be the only level of the LSM tree that can contain sstables including respective segments of the key space that may overlap and have overlapping keys. Such an exception can be necessary to allow LSM tree-based storage engines to support ingesting large amounts of data, such as when using an import statement. Such an exception can be necessary to allow for easier and more efficient flushes of memtables as described herein.

In some cases, a process of merging (e.g., combining) sstables and transferring the sstables from L0 to lower levels (e.g., L1-L6) in the LSM tree may be referred to as "compaction". Compaction may include deleting sstables in a first, higher level of the LSM tree and writing a new sstable including at least some (e.g., all) the data of the deleted sstables in a second, lower level of the LSM that is below (e.g., immediately below) the first level. The storage engine may operate to compact data as quickly as possible. As a result of compaction, lower levels of the LSM tree can (e.g., should) include larger numbers of sstables and/or larger-sized sstables that contain less recently updated keys, while higher levels of the LSM tree can (e.g., should) include smaller numbers of sstables and/or smaller-sized sstables that contain more recently updated keys. A size of an sstable may correspond to a storage (e.g., byte) size of the sstable. Generally, during normal operation of an LSM tree, lower levels of the LSM tree store more data (e.g., a greater number of bytes) than higher levels of the LSM tree.

In some cases, the compaction process is necessary to enable efficient operation of an LSM tree. From L0 down to L6 and during normal (e.g., healthy) operation of the LSM tree, each level of the LSM tree should have about 1/10 (10%) as much data (e.g., by storage size for the data) as the next level below. For example, L1 should store about 1/10 of the amount of data stored by L2, L2 should store about 1/10 of the amount of data stored by L3, and so on. For optimized operation of the LSM tree, as much data as possible is stored in larger sstables included in lower levels of the LSM tree. When compaction operations fall behind and sstables are not able to be compacted to lower levels of the LSM tree at a sufficient rate, an inverted LSM tree can form based on accumulation of sstables at higher levels of the LSM tree as described herein.

In some cases, sstables are not modified during the compaction process. In some cases, new sstables are instead written, and old sstables are deleted. This design takes advantage of the fact that sequential disk access is faster than random disk access.

In some cases, the process of compaction can operate as follows: if two sstables referred to as sstable "A" and sstable "B" need to be merged, their contents (e.g., KV pairs) are read into memory (e.g., volatile storage of a node). Based on reading the contents of the sstables A and B, the contents are sorted (e.g., sorted by key) in a list and merged together in memory, and a new sstable "C" is opened and written to disk (e.g., non-volatile, persistent storage of a node) with the new, larger sorted list of KV pairs. Based on the sstable C being written to disk, the old sstables A and B may be deleted.

In some cases, if the compaction process for the LSM tree falls behind the amount of data being added to the LSM tree (e.g., via admission of work items), more data may be stored at a higher level of the LSM tree than a lower level of the LSM tree and a shape of the LSM tree can become inverted. An inverted LSM tree (not shown in FIG. 3) can have degraded read performance and high read amplification. For an inverted LSM tree, read operations are required to start in higher levels of the LSM tree and search (referred to as "look down") through a number of sstables in different levels of the LSM tree to read a particular key's correct (e.g., newest or freshest) value. A state where the storage engine needs to read from multiple memtables and/or sstables in order to service a single logical read operation may be referred to as "read amplification". Read amplification can be especially harmful when a large import operation overloads the cluster (e.g., based on insufficient CPU capacity) and the storage engine is required to search a number of smaller-sized sstables in L0 to identify the most up-to-date values of the keys being read (e.g., using a select operation). In some cases, a certain amount of read amplification is expected in a normally functioning cluster. For example, an LSM tree can be considered to be healthy (e.g., have sufficient performance) when a read amplification factor for the LSM tree is less than 10. A read amplification factor may refer to a number of memtables and levels of sstables in the LSM tree that are required to be read to service a particular read operation. A value for a read amplification factor may be equivalent to a number of memtables included in an LSM tree, a number of vertically disposed, horizontal lower levels (e.g., L1-L6) of the LSM tree, and a number of vertically disposed, horizontal sub-levels included in a top level (e.g., L0) of the LSM tree.

In some cases, write amplification can impact an LSM tree. In some cases, write amplification can refer to rewriting (e.g., deleting and writing) of sstables by a storage engine as a part of compaction operations for an LSM tree. For example, when a storage engine executes a number of compaction operations in L5 of an LSM tree, the storage engine may repeatedly rewrite sstables included in L5. Such repeated rewriting of sstables can be a performance tradeoff, since when the storage engine does not perform compaction operations at a sufficient rate, a size of L0 of the LSM tree can increase to be too large and an inverted LSM tree can form.

In some cases, read amplification and write amplification may be key performance indicators for an LSM tree. For optimal database performance, both read amplification and write amplification must not occur in excess and must be kept in balance. Maintaining such a balance can involve tradeoffs. In some cases, inverted LSM trees can have excessive compaction debt, which refers to the storage engine having a large backlog of compaction operations to perform to return the inverted LSM tree to a healthy, non-inverted state.

In some cases, to facilitate managing the LSM tree structure, the storage engine can maintain an in-memory representation of the LSM tree referred to as a "memory table" or "memtable". In some cases, an LSM tree may not include a memtable (e.g., after a memtable is flushed to L0-L6 of the LSM tree). In some cases, an LSM tree may include one or more memtables. Write operations to the LSM tree may be considered durable when the work items for write operations have been (i) added to a memtable (e.g., thereby making the written value(s) visible to subsequent read operations), and (ii) written to a write-ahead log (WAL) file. A memtable may have a fixed amount of memory (e.g., 128 MB), such that when a memtable is full, the memtable stops accepting new write operations and a new memtable is generated to receive the new write operations. In some cases, the storage engine may enforce a maximum allowed number of memtables for an LSM tree. As an example, an LSM tree may not include more than 2-10 memtables and may preferably not include more than 4 memtables. In some cases, data from a memtable is periodically flushed (e.g., transferred) to sstables of the LSM tree stored on persistent storage media. Data from a memtable may be flushed to levels (e.g., L0-L6) of the LSM tree when the memtable reaches a maximum memory capacity. In some cases, a WAL file stored on the persistent storage media can be associated with each memtable to ensure durability in case of node failures (e.g., power loss or other unavailability). The WAL file can store the newest (e.g., freshest or most recent) operations issued to the storage engine by the replication layer. Each WAL file may have a one-to-one correspondence with a memtable. Each WAL file and memtable can be kept in sync and updates from the WAL file and memtable can be written to sstables periodically as part of operations of the storage engine.

Figure 4:
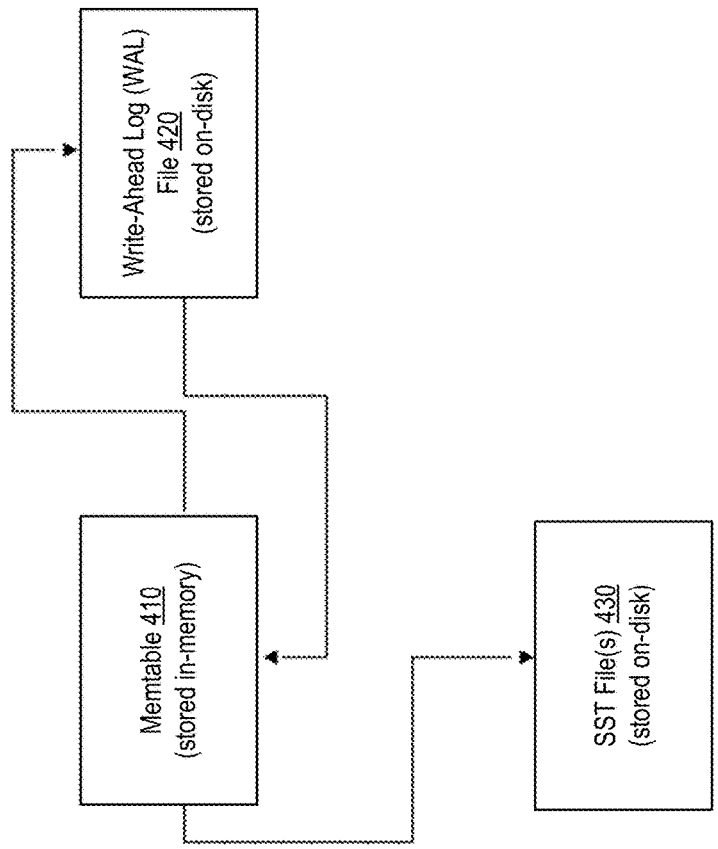
FIG. 4 shows an exemplary block diagram illustrating a storage layer of a computing system, according to some embodiments.

FIG. 4 shows an exemplary block diagram 400 illustrating a relationship between the memtable 410, the WAL file 420, and one or more sstables 430 included in the storage layer of the database. A memtable 410 may be stored in volatile storage media of a node. A WAL file 420 may be stored on persistent, non-volatile storage media of a node. One or more sstables 430 may be stored on persistent, non-volatile storage media of a node. As shown in FIG. 4, new values may be simultaneously written to the WAL file 420 and the memtable 410. From the memtable 410, the stored values may be eventually written to the one or more sstables 430 on disk for longer-term storage. As described herein, one or more memtables 410 may be included in an LSM tree that each correspond to a respective WAL file 420.

In some cases, a design of the LSM tree can optimize write operation performance over read operation performance. By storing sorted KV data in sstables, the storage engine avoids random disk searches when performing write operations. The storage engine of the storage layer can attempt to mitigate the cost of read operations (random searches) by executing read operations at sstables located in the lowest possible levels of the LSM tree, such that the storage engine reads from fewer, larger sstables. The storage engine performs compaction operations to compact and merge sstables to produce the fewer, larger files located in lower levels of the LSM tree. In some cases, the storage engine can use a block cache to increase the speed of read operations. The tradeoffs in the design of the LSM tree are intended to take advantage of the operating parameters of modern disk storage, since modern disk storage can provide faster read operations of random locations on disk due to caches, but can perform relatively poorly on write operations directed to random locations.

Background on Sstables

As described herein, LSM tree storage systems can store KV pairs in sstables included in an LSM tree stored by an individual node. In an sstable, KV pairs are stored and sorted by key in a sequence of data blocks. In some cases, an LSM tree storage system of a particular node may include a number of sstables. Each sstable may (i) correspond to a segment of a key space of permissible key-values and (i) have particular key boundaries, such that each sstable includes KV entries corresponding to a particular key range of the key space. A first sstable of a number of sstables may or may not include keys within a range of a second sstable of the number of sstables. For example, for keys ranging from integers of 1-9 (smallest to largest keys), a first sstable may have a key range of [1, 5) and a second sstable may have a key range of [4, 9). An sstable may be selected from a number of sstables of an LSM tree based on a key range of the sstable (e.g., according to a target and/or selected key range indicated by a query). To enable efficient key lookup and range scans, sstables can include an additional index structure referred to herein as a "BlockHandle" (also referred to as a "block handle"). An sstable can include a number (e.g., series) of second-level index blocks, where each second-level index block includes a key per data-block mapped to the second-level index block (e.g., where the key is typically the last key included in the respective data block). A second-level index block may have a maximum capacity (e.g., 256 kilobytes (KB)), such that a number of second-level index blocks are needed for indexing mappings of data blocks to BlockHandles as described herein. Additional second-level index block(s) may be created (e.g., generated) for an sstable based on the second-level index block(s) of an sstable meeting a maximum storage capacity.

In some embodiments, an index block can include one or more KV pairs that each map a key to a BlockHandle, where the BlockHandle is the value mapped to the key in the KV pair. A BlockHandle encodes and identifies the location of a particular block (e.g., index block or data block) within the sstable file and can be represented as a tuple. An example tuple that represents a BlockHandle may be (file-offset, block-length), where "file-offset" may indicate the location of a data block or index block within the sstable file and "block-length" indicates the length (e.g., data storage size) of the respective data block or index block. Such a tuple may be used by a node to read data from an sstable for a particular interval of the sstable file (e.g., starting from a beginning of the sstable file) that is defined by a starting position and ending position within the sstable file. For example, based on a tuple corresponding to a BlockHandle, a node may read data from the sstable file for a byte interval of [file-offset, file-offset+block-length) bytes from a beginning of the sstable file. In some cases, an sstable can include a single top-level index block that includes a key per second-level index block (e.g., where the key is typically the last key included in the respective second-level index block). The top-level index block may be hierarchically layered above the second-level index block(s) of the sstable. The top-level index block can map keys to BlockHandles (e.g., where the BlockHandle is the respective value mapped to the key in the KV pair). A BlockHandle can function as a data "pointer" that is used to read the associated block (e.g., second-level index block or data block) indicated by the pointer.

Figure 5:
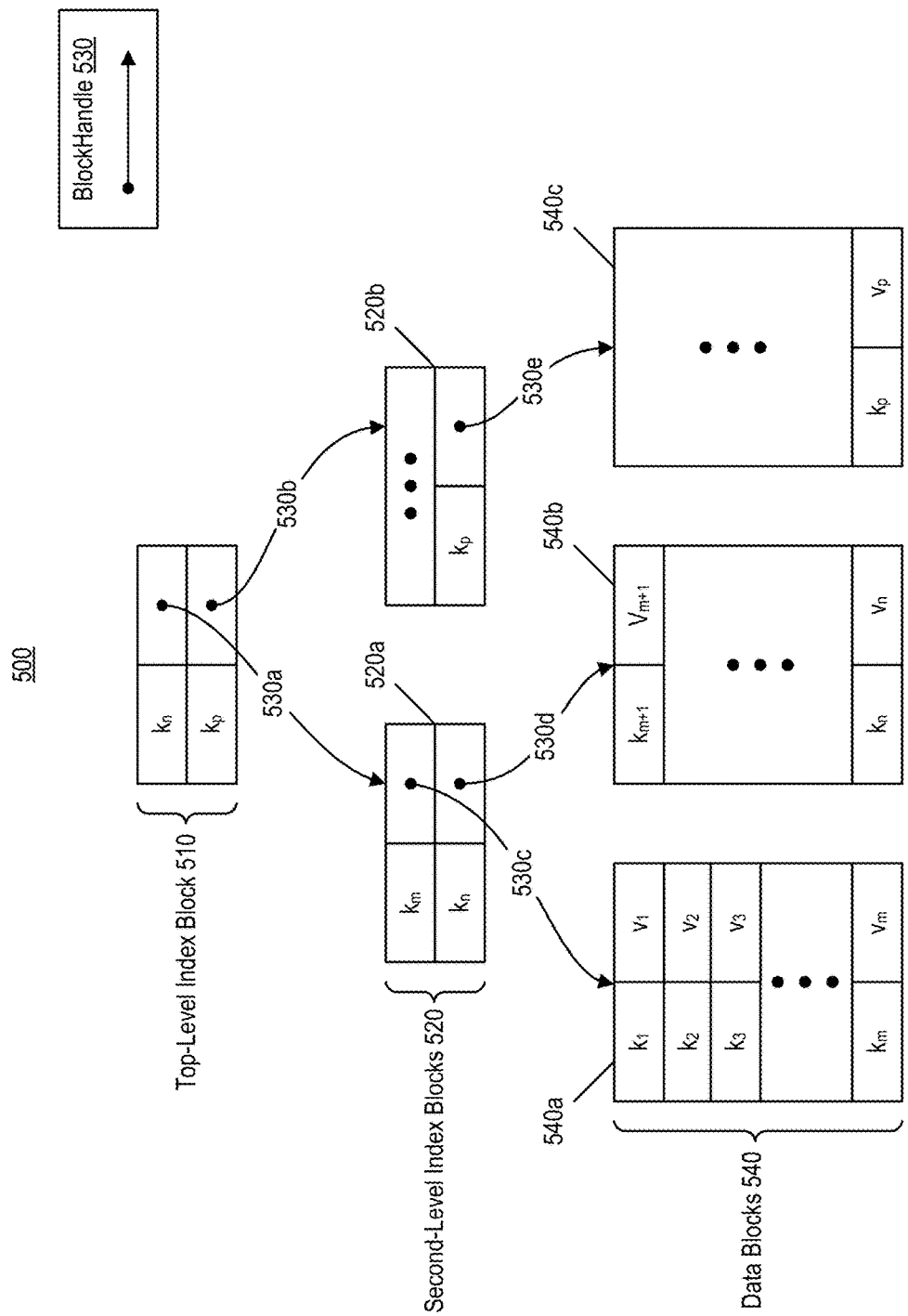
FIG. 5 shows an exemplary illustration of an sstable, according to some embodiments.

FIG. 5 shows an exemplary illustration of an sstable 500. The sstable 500 includes a top-level index block 510, one or more second-level index blocks 520, and one or more data blocks 540. As shown in FIG. 5, "k" refers to a key of a particular KV pair and "v" refers to a value of a particular KV pair. The top-level index block 510 includes a key per second-level index block 520 of the sstable 500. As an example, a top-level index block 510 may include a number of keys equivalent to a number of second-level index blocks 520 included in the sstable 500. As shown in FIG. 5, the top-level index block 510 includes keys $k_n$ and $k_p$ that map to BlockHandles 530a and 530b, respectively. The BlockHandle 530a encodes and identifies the location of the second-level index block 520a within the sstable 500. The BlockHandle 530b encodes and identifies the location of the second-level index block 520b within the sstable 500. The second-level index blocks 520 include a key per data block 540 mapped to each of the second-level index blocks 520. As shown in FIG. 5, the second-level index block 520a includes keys $k_m$ and $k_n$ that map to BlockHandles 530c and 530d, respectively, and the second-level index block 520b includes a key $k_p$ that maps to BlockHandle 530e.

Each of the data blocks 540 can include one or more KV pairs. As shown in FIG. 5, for the index blocks 510 and 520 and data blocks 540 of the sstable 500, "m", "n", and "p" can refer to any suitable identifier, including integers greater than 0. In some cases, keys in each data block 540 may be sorted. For example, for data block 540a, keys may be sorted from $k_1$ to $k_m$, where m is an integer that is greater than 1. Keys in each data block may be sorted using any suitable technique including, for example, alphabetically, numerically, alphanumerically, and chronologically. As shown in FIG. 5, the data block 540a includes keys $k_1$ to $k_m$ which are mapped to values $v_1$ to $v_m$, respectively. The data block 540b includes keys $k_{m+1}$ to $k_n$ which are mapped to values $v_{m+1}$ to $v_n$, respectively, and where n is greater than m. The data block 540c includes one or more KV pairs, including at least key $k_p$ which is mapped to value $v_p$. While the sstable 500 is shown as including the top-level index block 510, the second-level index blocks 520a and 520b, and the data blocks 540a, 540b, and 540c, the sstable 500 may include any suitable number of second-level index blocks 520 based on any suitable number of data blocks 540.

In some cases, an iterator operating at a node of the cluster storing an LSM tree and one or more sstables may be used to query, identify, and return data in response to a particular query operation. To query (e.g., search) the sstable 500, an iterator can first scan the top-level index block 510 and compare the search key (e.g., included in a received query) to the keys included in the top-level index block 510 to find the appropriate second-level index block(s) 520 that includes key(s) corresponding to the search key. In some cases, the search key may include one or more search keys and/or one or more search key ranges. Based on finding the appropriate key in the top-level index block 510 that corresponds to the search key, the iterator decodes the BlockHandle stored in the value mapped to the appropriate key and loads the referenced second-level index block 520. The iterator can load the second-level index block 520 by reading block-length bytes from the sstable 500 starting at position in the sstable indicated by the file-offset included in BlockHandle tuple (e.g., defined by the [file-offset, file-offset+block-length) interval). Based on loading the second-level index block 520, the iterator can scan the second-level index block 520 and compare the search key to the keys included in the second-level index block 520 to find the appropriate data block(s) 540 that includes key(s) corresponding to the search key. Based on finding the appropriate key in the second-level index block 520 that corresponds to the search key, the iterator decodes the BlockHandle stored in the value mapped to the appropriate key and loads the referenced data block 540. Based on loading the referenced data block 540, the iterator can scan the data block 540 to identify the KV data corresponding to the search key. The iterator may cause sending of the KV data corresponding to the search key to a client device (e.g., via a gateway node).

Block Property Collection

In some embodiments, a user of an LSM tree storage system (e.g., corresponding to the cluster 102) can configure and operate one or more block property collectors (e.g., via a client device 106). Each block property collector may be identified by a unique string name. A unique string name for each block property collector corresponding to an sstable may be recorded and/or otherwise indicated in a table properties block of the sstable. The unique string name corresponding to each block property collector can be used by a block property filter to query a data block when a query is issued (e.g., by a user via a client device). An example block property collector may be an MVCC-time-interval collector that collects MVCC timestamps from the KV pairs within a block (e.g., index block and/or data block) and has "MVCC-time-interval" as a unique string name. Another example block property collector may be an integer-value-interval collector that collects the minimum and maximum values (e.g., interpreted as integers) from the KV pairs within a block and has "integer-value-interval" as a unique string name. Each unique string name for a block property collector may be mapped to a unique integer (e.g., 8-bit integer) as described herein.

Figure 6:
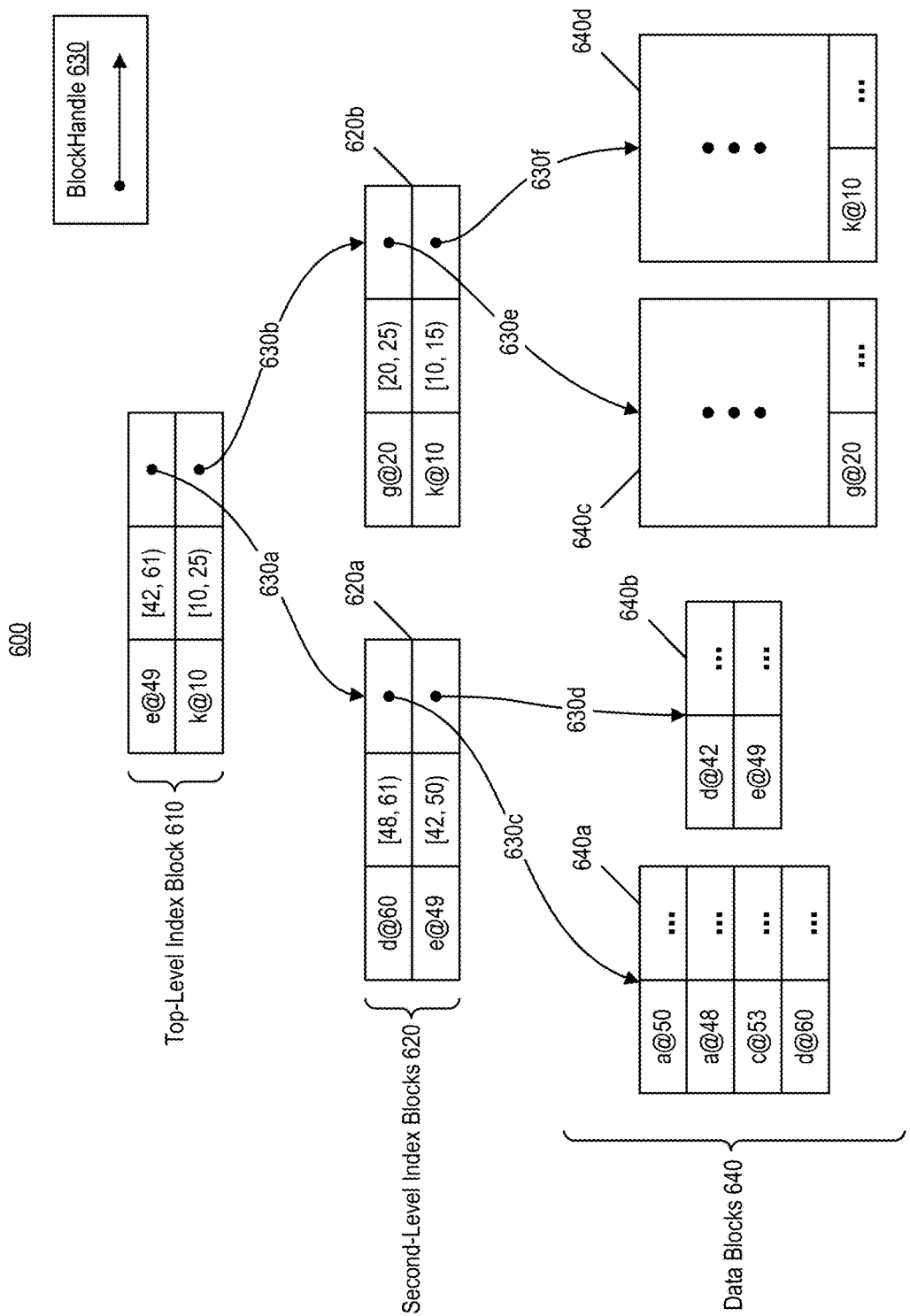
FIG. 6 shows an exemplary illustration of an sstable, according to some embodiments.

In some embodiments, a block property collector may be a function and/or an operator that can be used to derive and/or encode (e.g., concisely encode) an attribute or a set of attributes in a set of KV pairs of an sstable. Attributes may be based on values of KV pairs of an sstable and/or other features (e.g., timestamps, key version identifiers, etc.) corresponding to KV pairs of an sstable. For example, for the exemplary MVCC-time-interval collector described herein, the encoded attribute is an MVCC timestamp interval, where the encoding is the [minimum-time, maximum-time) interval computed from the timestamps of the set of KV pairs included in a data block and/or a second-level index block, where "minimum-time" refers to the minimum (e.g., oldest) timestamp of the timestamps of the set of KV pairs and "maximum-time" refers to the maximum (e.g., newest) timestamp of the timestamps of the set of KV pairs. FIG. 6 shows an exemplary sstable 600 including encoded attributes (e.g., MVCC timestamp intervals) in a set of KV pairs. While the sstable 600 of FIG. 6 is shown and described as including MVCC timestamp interval block properties, any suitable block properties as described herein may be included and encoded in the sstable 600. Referring to FIG. 6, the sstable 600 includes a top-level index block 610, two second-level index blocks 620, and four data blocks 640. While the sstable 600 is shown and described as including a particular number of top-level index blocks 610, second-level index blocks 620, and data blocks 640, it will be understood by one of ordinary skill in the art that the sstable 600 may include only one top-level index block 610, one or more second-level index blocks 620, and one or more data blocks 640. In some cases, an sstable 600 may include N levels of index blocks, where N refers to any positive integer. In most cases, an sstable 600 may include two levels of index blocks (e.g., a top-level index block 610 and one or more second-level index blocks 620) as described herein.

In some embodiments, the top-level index block 610 includes a key per second-level index block 620 of the sstable 600. In some cases, keys in an sstable (e.g., sstable 600) may be represented by one or more attributes. For example, as shown in FIG. 6, keys may be a two-attribute key including a string identifier and a version identifier (e.g., represented as "string@version"), which may be common in multi-versioning systems (e.g., MVCC databases). As shown in FIG. 6, the top-level index block 610 includes keys e@49 (e.g., key "e" at version 49) and k@10 (e.g., key "k" at version 10) that map to BlockHandles 630a and 630b, respectively. The BlockHandle 630a encodes and identifies the location of the second-level index block 620a within the sstable 600. The BlockHandle 630b encodes and identifies the location of the second-level index block 620b within the sstable 600. The second-level index blocks 620 include a key per data block 640 mapped to each of the second-level index blocks 620. As shown in FIG. 6, the second-level index block 620a includes keys d@60 and e@49 that map to BlockHandles 630c and 630d, respectively, and the second-level index block 620b includes keys g@20 and k@10 that map to BlockHandles 630c and 630d, respectively.

Each of the data blocks 640 can include one or more KV pairs. In some cases, keys in each data block 640 may be sorted (e.g., numerically, alphabetically, alphanumerically, chronologically, etc.). For example, for data block 640a, keys may be sorted alphabetically (e.g., from A to Z) based on the string attribute of the key, resulting in the keys of the data block 640a being sorted from a@50 to d@60. As shown in FIG. 6, the data block 640a includes keys a@50 to d@60, which are mapped to any suitable respective values. The data block 640b includes key d@42 and e@49, which are mapped to any suitable respective values. The data block 640c includes one or more KV pairs, including at least key g@20 which is mapped to any suitable respective value. The data block 640d includes one or more KV pairs, including at least key k@10, which is mapped to any suitable respective value. While the sstable 600 is shown as including the top-level index block 610, the second-level index blocks 620a and 620b, and the data blocks 640a, 640b, 640c, and 640d, the sstable 600 may include any suitable number of second-level index blocks 620 and may include any suitable number of data blocks 640, where in the number of second-level index blocks 620 included in the sstable 600 is based on the number of data blocks 640 included in the sstable 600.

In some embodiments, the KV pairs of the sstable may include and/or otherwise correspond to one or more attributes. In some cases, the attributes may include and/or be included in the values of the KV pairs (e.g., KV pairs of data blocks). In some cases, the attributes may include and/or be included in other features of the KV pairs (e.g., key attributes such as key prefixes, MVCC timestamps, and/or version identifiers). As described herein, a block property collector may encode a "block property" (also referred to as a "block property value") based on attributes of KV pairs and/or encoded block properties of KV pairs in an sstable. A block property may summarize and/or otherwise describe qualitative and/or quantitative attributes of KV pairs in a particular block (e.g., data block or index block) included in an sstable. A block property may provide an indication of a range and/or values (e.g., category(ies)) corresponding to the attributes of KV pairs in a particular block. As one example, block property values may be MVCC timestamp intervals and/or ranges that are encoded based on MVCC timestamps of KV pairs in data blocks of an sstable, such that the encoded block property values are representative of the range of MVCC timestamps of KV pairs in the data blocks. In some cases, block property values encoded by a block property collector may be included in a BlockHandle as described herein, where the BlockHandle is a value for a particular KV pair included in an index block of the sstable. Encoding a block property for a particular block (e.g., index block or data block) may include encoding a block property in a BlockHandle that points to the particular block. In some cases, more than one block property value may be encoded in a BlockHandle for a particular block.

Referring to FIG. 6, the data block 640a is shown and described as including KV pairs with MVCC timestamps included in the interval [48, 61) based on the mapping of the respective MVCC timestamps to the BlockHandle 630c in the second-level index block 620a. MVCC timestamps of a particular data block 640 may be indicated by a mapping of a key, an MVCC timestamp interval, and a BlockHandle 630 in a second-level index block 620. MVCC timestamps of data blocks 640 that are mapped to a particular second-level index block 620 may be indicated by a mapping of a key, an MVCC timestamp interval, and a BlockHandle 630 in a top-level index block 610. A starting timestamp of a timestamp interval (e.g., MVCC timestamp interval) as described herein may be less than or equal to a minimum timestamp corresponding to the KV pairs included in a block (e.g., index block and/or data block). An ending timestamp of a timestamp interval (e.g., MVCC timestamp interval) as described herein may be greater than or equal to a maximum timestamp corresponding to the KV pairs included in a block (e.g., index block and/or data block). While timestamp intervals are described herein as being inclusive at a starting timestamp and non-inclusive at an ending timestamp, any suitable range for a timestamp interval may be used by a block property collector and encoded with a BlockHandle. Such properties may be apply to other intervals and/or ranges encoded by a block property collector.

A block property indicated by a KV entry in a top-level index block 610 (e.g., indicated by a BlockHandle) may be indicative of the block properties of second-level index blocks 620 and corresponding data blocks 640 that are mapped to the respective top-level index block 610. For example, a range of MVCC timestamps corresponding to the KV entries of the data blocks 640a and 640b is indicated by the timestamp interval [42, 61) at key e@49 in the top-level index block 610. A block property indicated by a KV entry in a second-level index block 620 (e.g., indicated by a BlockHandle) may be indicative of the block properties of data blocks 640 that are mapped to the respective second-level index block 620. For example, the timestamp interval [42, 50) at key e@49 in the second-level index block 620a indicates a range of MVCC timestamps corresponding to the KV entries of the data block 640b.

In some embodiments, the MVCC timestamp intervals are encoded in a BlockHandle 630 of a data block 640 and/or a second-level index block 620. For example, MVCC timestamps could be encoded using variable length integer encoding techniques (referred to as "varint" encoding) followed by varint encoding of a difference (e.g., delta) between the first encoded value of the interval and the second encoded value of the interval. For example, varint encoding of an MVCC timestamp interval for [48, 61) may be [varint(48), varint(13)) based on a minimum timestamp of 48 and a maximum timestamp of 61 for KV pairs in a data block 640. Any suitable encoding techniques for the MVCC timestamp intervals may be used. MVCC timestamps intervals are an example of a block property value that can be encoded in a BlockHandle 630 and any suitable block property corresponding to an attribute of a KV pair (e.g., including the key and/or the value of the KV pair) may be encoded based on a block property collector.

In some cases, an index block (e.g., top-level index block 610 or second-level index block 620) and a data block 640 can include one or more block properties. In an sstable (e.g., sstable 600), each unique string name of a respective block property collector can be locally mapped to a unique identifier (e.g., an 8-bit (1 byte) integer) that serves as an identifier for the block property in the sstable. In some cases, a sequence of block properties for an index block and/or data block can be encoded in a sequence (e.g., as a byte sequence). As an example, a single block property of an index block and/or data block can be encoded as a byte sequence in the following format of Expression 1:

Block Property Formatting: (<1-byte-property-identifier><varint-encoded-property-value-length><property-value>)     (1)

As shown above, "<1-byte-property-identifier>" can refer to an 8-bit integer that serves as a unique identifier for the block property, "<varint-encoded-property-value-length>" can refer to an encoded length of the block property value, and "<property-value>" can refer to the block property value for the index block and/or data block. The above-described byte sequence format may be repetitively encoded for each block property corresponding to an index block and/or a data block. For example, a data block with three block properties may include three sequential encodings of different block properties according to the above-described byte sequence format. In some cases, in an index block and a data block including more than one block property, block properties may be sorted according to block property identifier (referred to as a "1-byte-property-identifier" in the above-described byte sequence format). Based on the addition of block properties to KV pairs of sstables, a tuple of a BlockHandle as described herein (e.g., as values in top-level index blocks and second-level index blocks) may be represented as (file-offset, block-length, properties), where "properties" is a byte array encoded in the above-described "Block Property Formatting" byte sequence format of Expression 1 for one or more block properties.

While FIG. 6 is described with respect to an MVCC timestamp as an exemplary block property of data blocks, any suitable block property and any suitable number of block properties may be encoded for data blocks 640 and for corresponding second-level index blocks 620 and a top-level index block 610. As an example, a block property collector may encode block properties corresponding to KV pairs of an sstable that include categorical values, such as enumerated type (enum) values, where the enum values may be course status identifiers including "Open", "Closed", "Canceled", and "Waitlist".

Block Property Collector Interface

In some embodiments, a block property collector may be used to encode one or more block properties to Block-Handles of KV pairs during writing of an sstable. By encoding block properties in sstables, the block properties can be filtered and used to increase the efficiency of user queries directed to the data stored in an sstable. An interface of a block property collector (referred to as "BlockPropertyCollector") function used to write an sstable is described by Table 1.

TABLE 1

| Line | Code |
|---|---|
| 1 | // BlockPropertyCollector is used when writing an sstable. |
| 2 | // - All calls to Add are included in the next FinishDataBlock, after which |
| 3 | // the next data block is expected to start. |
| 4 | // - The index entry generated for the data block, which contains the block property |
| 5 | // value from FinishDataBlock, is not immediately included in the current |
| 6 | // index block. It is included when AddPrevDataBlockToIndexBlock is called. |
| 7 | // AddPrevDataBlockToIndexBlock must be called before keys are |
| 8 | // added to the new data block. |
| 9 | type BlockPropertyCollector interface { |
| 10 |   // Name returns the name of the block property collector. |
| 11 |   Name( ) string |
| 12 |   // Add is called with each new entry added to a data block in the |
| 13 |   // sstable. The callee can assume that these are in sorted order. |
| 14 |   Add(key InternalKey, value [ ]byte) error |
| 15 |   // FinishDataBlock is called when all the entries have been added to a |
| 16 |   // data block. Subsequent Add calls will be for the next data block. It |
| 17 |   // returns the block property value for the finished data block. |
| 18 |   FinishDataBlock( ) ([ ]byte, error) |
| 19 |   // AddPrevDataBlockToIndexBlock adds the block property value |
| 20 |   // corresponding to the previous FinishDataBlock to the current index block. |
| 21 |   AddPrevDataBlockToIndexBlock( ) |
| 22 |   // FinishIndexBlock is called when an index block, containing all the |
| 23 |   // KV pairs since the last FinishIndexBlock, will no longer see |
| 24 |   // new entries. It returns the block property value for the index block. |
| 25 |   FinishIndexBlock( ) ([ ]byte, error) |
| 26 |   // FinishTable is called when the sstable is finished, and returns the |
| 27 |   // block property value for the sstable. |
| 28 |   FinishTable( ) ([ ]byte, error) |
| 29 | } |

Figure 7A:
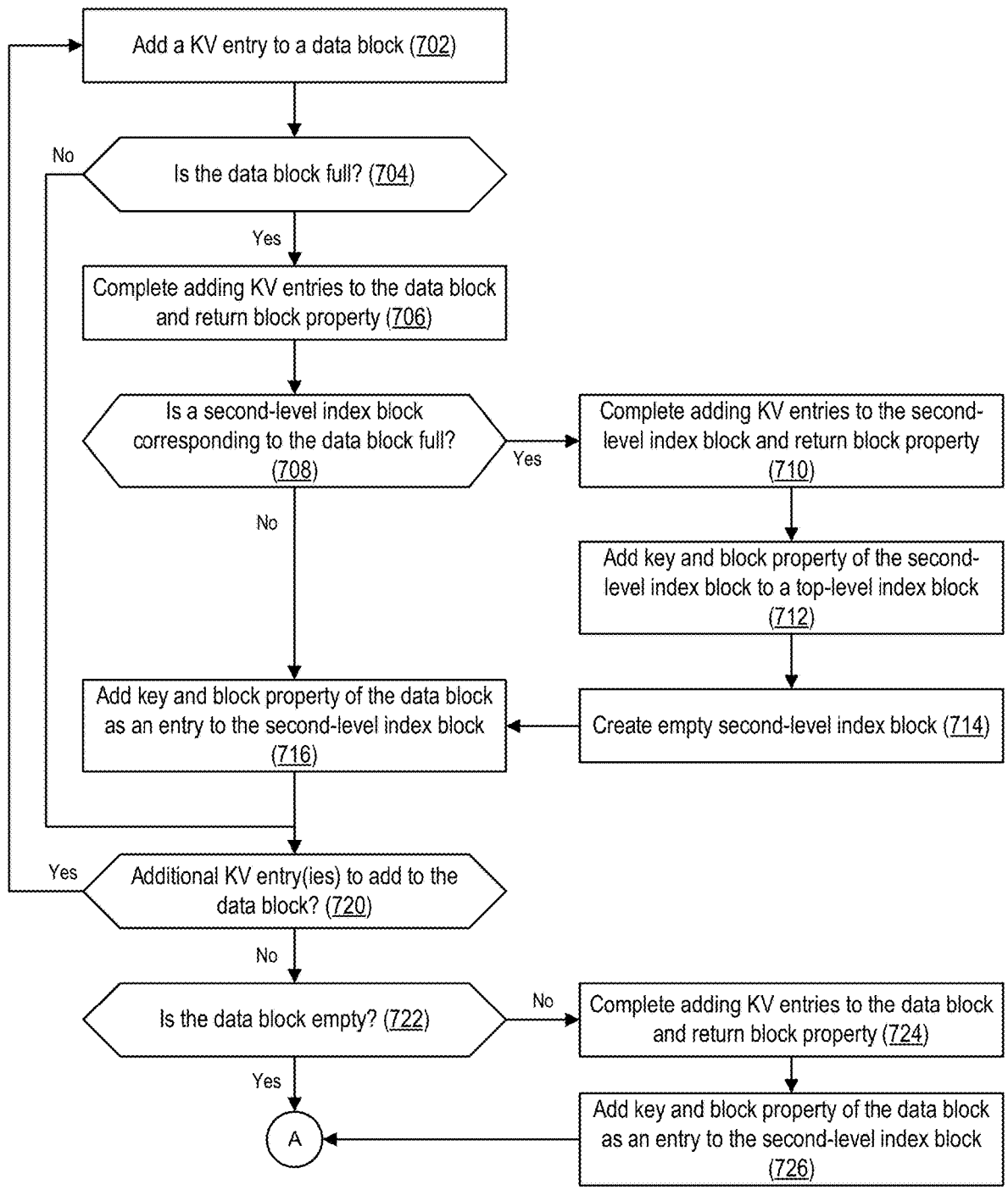
FIG. 7A shows an exemplary flowchart of a method for writing an sstable including one or more block properties, according to some embodiments.
Figure 7B:
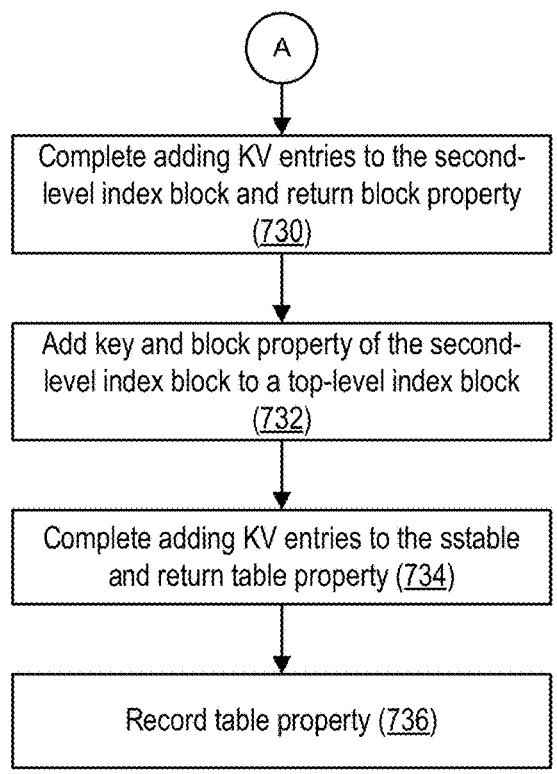
FIG. 7B shows an exemplary flowchart of a method for writing an sstable including one or more block properties, according to some embodiments.

As shown in Table 1, a BlockPropertyCollector operation can represent the functionality of a block property collector as described herein. In some embodiments, a node (e.g., node 120) of a cluster (e.g., cluster 102) may execute a method for block property collection during writing of an sstable (e.g., sstable 600). FIGS. 7A and 7B show an exemplary flowchart of a method 700 for writing an sstable. The method 700 may be executed by a node (e.g., node 120) of a cluster (e.g., cluster 102). The method 700 may be executed for a block property collector that is configured to encode one or more block properties. In some cases, prior to execution of the method 700, a node may create a new, empty sstable file to which generated data blocks and index blocks will be added.

At step 702, a node may add a KV entry to a data block of an sstable file. The node may execute a BlockPropertyCollector.Add(k, v) operation in accordance with Table 1 to add the KV entry to the data block, where "k" refers to any suitable key and "v" refers to any suitable value. In some cases, adding the KV pair to the data block may include creating (e.g., generating) and/or constructing a data block prior to adding the KV pair (e.g., for the first KV pair of the sstable file and/or for when a previous data block is full). For example, after determining the data block is full at step 704 and after determining additional KV entries are to be added to a data block at step 720, the node may create (e.g., generate) and/or construct a new, empty data block in the sstable file.

At step 704, the node may determine whether the data block to which the KV entry is to be added is full. Determining whether the data block is full may include determining whether a size of the data (e.g., KV pairs) stored by the data block has reached or exceeded a threshold storage capacity. As an example, a data block may have a maximum capacity of 32 kilobytes (KB). A data block may be configured to have any suitable storage capacity. If the node determines the data block is full, the method 700 may proceed to step 706. If the node determines the data block is not full, the method 700 may proceed to step 720.

At step 706, the node may complete adding KV entries to the data block and may return a block property corresponding to the data block. The block property may be indicative of a type and values of the attributes of KV entries included in the data block. As an example, the returned block property may be an MVCC timestamp interval for the KV entries included in the data block, where the MVCC timestamp interval defines (e.g., is equivalent to) a range of MVCC timestamps corresponding to the KV entries. As another example, the returned block property may be a sequence of enum values included in the values for the KV entries included in the data block. In some cases, more than one block property may be returned. The node may execute a BlockPropertyCollector.FinishDataBlock operation in accordance with Table 1 to complete adding KV pair entries to the data block and return one or more block properties corresponding to the data block.

At step 708, the node may determine whether a second-level index block corresponding to the data block is full. Determining whether the second-level index block is full may include determining whether a size of the data (e.g., KV pairs) stored by the second-level index block has reached or exceeded a threshold storage capacity. As an example, an index block may have a maximum capacity of 256 KB. An index block may be configured to have any suitable storage capacity. If the node determines the second-level index block is full, the method 700 may proceed to step 710. If the node determines the second-level index block is not full, the method 700 may proceed to step 716.

At step 710, the node may complete adding KV entries to the second-level index block and may return a block property corresponding to the second-level index block. The block property may be indicative of a type and values of the attributes of KV entries included in the second-level index block. As an example, the returned block property may be an MVCC timestamp interval for the KV entries of data block(s) mapped to the second-level index block, where the MVCC timestamp interval defines (e.g., is equivalent to) a range of MVCC timestamps corresponding to the KV entries. In some cases, more than one block property may be returned. The node may execute a BlockPropertyCollector.FinishIndexBlock operation in accordance with Table 1 to complete adding KV pair entries to the second-level index block and return one or more block properties corresponding to the second-level index block.

At step 712, the node may add a key and a block property of the second-level index block (e.g., returned at step 710) to a top-level index block. The block property may be included in a BlockHandle that points to the second-level index block as described herein, where the added key and BlockHandle form a KV entry in the top-level index block. The added key may be the last key of the second-level index block and the block property may be based on (e.g., equivalent to or indicative of) the encoded block properties included in the second-level index block. For example, the added key and block property may be e@49 and [42, 61) as shown in the top-level index block of FIG. 6, where the MVCC timestamp interval [42, 61) is based on a combination of the intervals [48, 61) and [42, 50) included in the second-level index block 620. In some cases, the node may add more than one block property of the second-level index block to the top-level index block.

At step 714, the node may create (e.g., generate) and/or construct a new, empty second-level index block in the sstable file.

At step 716, the node may add a key and block property of the data block (e.g., returned at step 706) as a KV entry to a second-level index block (e.g., determined at step 708 or created at step 714). The block property may be included in a BlockHandle that points to the data block as described herein, where the added key and BlockHandle form a KV entry in the second-level index block. Adding the key and block property of the data block to the second-level index block may include encoding the BlockHandle that maps the second-level index block to the position of the data block in the sstable file. For example, the node may encode the BlockHandle 630c that maps the second-level index block 620a to the data block 640a as shown in FIG. 6. The added KV entry may include the block property in the encoded BlockHandle as described herein. The added key may be the last key of the data block and the block property may be based on (e.g., equivalent to or indicative of) the attributes included in the data block. For example, the added key and block property may be e@49 and [42, 50) as shown in the top-level index block of FIG. 6, where the MVCC timestamp interval [42, 50) is based on a combination of MVCC timestamps for the KV entries in the data block 640b. In some cases, the node may add more than one block property of the data block to the second-level index block. The node may execute a BlockPropertyCollector.AddPrevDataBlockToIndexBlock operation in accordance with Table 1 to add the entry corresponding to the data block to the second-level index block.

At step 720, the node may determine whether there are additional KV entries to add to the data block. If there is at least one KV entry to add to the data block, the method may return to step 702. If there is not at least one KV entry to add to the data block, the method may proceed to step 722.

At step 722, the node may determine whether the data block is empty. A data block may be empty if it does not include any KV entries. If the data block is not empty, the method may proceed to step 724. If the data block is empty, the method may proceed to step 730.

At step 724, the node may complete adding KV entries to the data block and may return a block property corresponding to the data block. The block property may be indicative of a type and values of the attributes of KV entries included in the data block. As an example, the returned block property may be an MVCC timestamp interval for the KV entries included in the data block, where the MVCC timestamp interval defines (e.g., is equivalent to) a range of MVCC timestamps corresponding to the KV entries. In some cases, more than one block property may be returned. The node may execute a BlockPropertyCollector.FinishDataBlock operation in accordance with Table 1 to complete adding KV pair entries to the data block and return one or more block properties corresponding to the data block.

At step 726, the node may add a key and block property of the data block (e.g., returned at step 724) as a KV entry to a second-level index block (e.g., determined at step 708 or created at step 714). The block property may be included in a BlockHandle that points to the data block as described herein, where the added key and BlockHandle form a KV entry in the second-level index block. Adding the key and block property of the data block to the second-level index block may include encoding the BlockHandle that maps the second-level index block to the position of the data block in the sstable file. For example, the node may encode the BlockHandle 630c that maps the second-level index block 620a to the data block 640a as shown in FIG. 6. The added key may be the last key of the data block and the block property may be based on (e.g., equivalent to or indicative of) the attributes included in the data block. For example, the added key and block property may be e@49 and [42, 50) as shown in the top-level index block of FIG. 6, where the MVCC timestamp interval [42, 50) is based on a combination of MVCC timestamps for the KV entries in the data block 640b. In some cases, the node may add more than one block property of the data block to the second-level index block. The node may execute a BlockPropertyCollector.AddPrevDataBlockToIndexBlock operation in accordance with Table 1 to add the entry corresponding to the data block to the second-level index block.

At step 730, the node may complete adding KV entries to the second-level index block and may return a block property corresponding to the second-level index block. The block property may be indicative of a type and values of the attributes of KV entries included in the second-level index block. As an example, the returned block property may be an MVCC timestamp interval for the KV entries of data block (s) mapped to the second-level index block, where the MVCC timestamp interval defines (e.g., is equivalent to) a range of MVCC timestamps corresponding to the KV entries. In some cases, more than one block property may be returned. The node may execute a BlockPropertyCollector.FinishIndexBlock operation in accordance with Table 1 to complete adding KV pair entries to the second-level index block and return one or more block properties corresponding to the second-level index block.

At step 732, the node may add a key and a block property of the second-level index block (e.g., returned at step 730) to the top-level index block. The block property may be included in a BlockHandle that points to the second-level index block as described herein, where the added key and BlockHandle form a KV entry in the top-level index block. The added key may be the last key of the second-level index block and the block property may be based on (e.g., equivalent to or indicative of) the encoded block properties included in the second-level index block. For example, the added key and block property may be e@49 and [42, 61) as shown in the top-level index block of FIG. 6, where the MVCC timestamp interval [42, 61) is based on a combination of the intervals [48, 61) and [42, 50) included in the second-level index block 620. In some cases, the node may add more than one block property of the second-level index block to the top-level index block.

At step 734, the node may complete adding KV entries to the sstable and may return a table property. A table property may be a block property corresponding to a top-level index block of an sstable. The table property may be based on (e.g., equivalent to or indicative of) a type and values of the attributes of KV entries included in the top-level index block. As an example, a table property for the sstable 600 of FIG. 6 may be an MVCC timestamp interval of [10, 61) based on the timestamp intervals [42, 61) and [10, 25) for the keys e@49 and k@10, respectively, of the top-level index block. In some cases, more than one table property may be returned. The node may execute a BlockPropertyCollector.FinishTable operation in accordance with Table 1 to complete adding KV entries to the sstable and return a table property.

At step 736, the node may record a table property (e.g., returned in step 734) for the sstable. The table property may be based on the encoded block properties included in the top-level index block. In some cases, the node may record more than one table property. The node may record the table property in a table properties block corresponding to (e.g., included in) the sstable.

Block Property Filtering

Figure 8A:
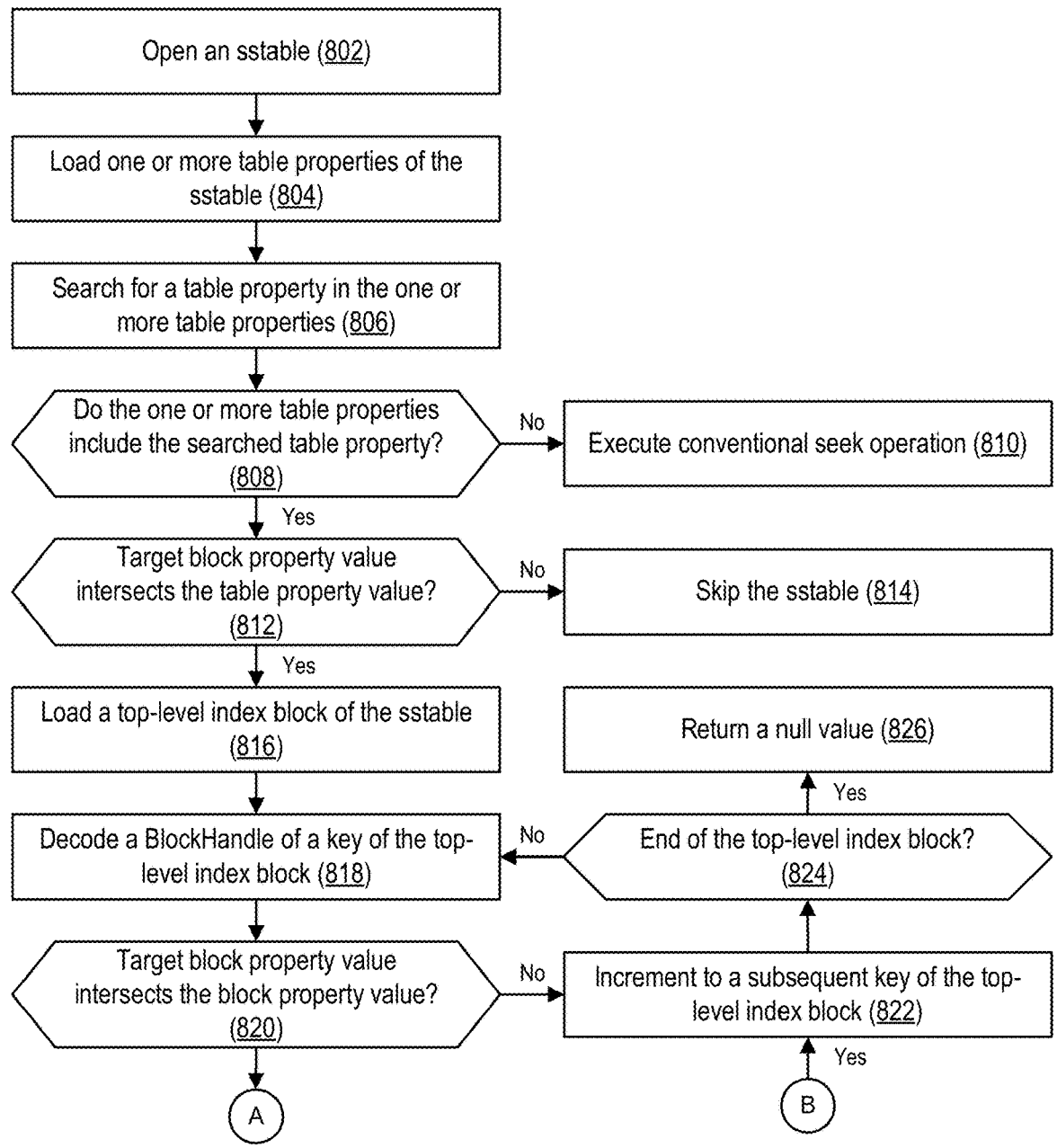
FIG. 8A shows an exemplary flowchart of a method for querying an sstable including one or more block properties, according to some embodiments.
Figure 8B:
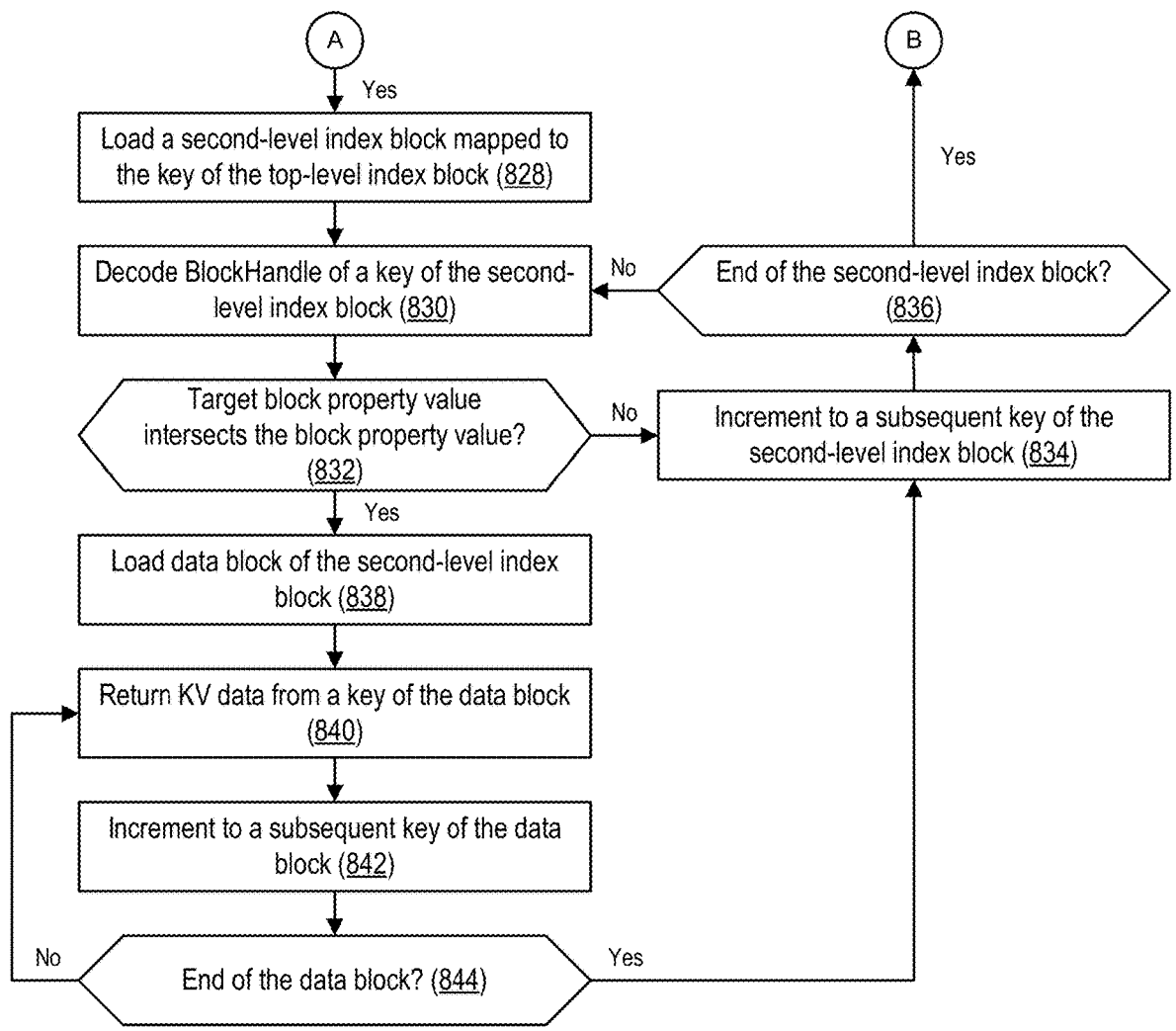
FIG. 8B shows an exemplary flowchart of a method for querying an sstable including one or more block properties, according to some embodiments.

Based on an sstable including one or more block properties (e.g., encoded as described with respect to the method 700), block properties can be used to query the sstable. Such block properties can be used to efficiently filter out keys that are outside the interval of block property values that are of interest to a user initiating the query. For example, block properties can be used to efficiently ignore irrelevant attributes (e.g., course numbers, MVCC versions, MVCC time stamps, etc.) that are outside of the relevant range (e.g., defined by a search key) included in a received query). A search key included in a query may include one or more values and/or intervals of values corresponding to one or more block properties encoded in an sstable. Use of block properties can increase efficiency of user queries (e.g., read operations) and can streamline internal system management operations. FIGS. 8A and 8B show an exemplary flowchart of a method for querying an sstable including one or more block properties. The method 800 may be executed by a node (e.g., node 120) of a cluster (e.g., cluster 102) based on a client device (e.g., client device 106) initiating a query (e.g., seek operation) for KV data stored by the cluster. A query directed to an sstable may include a search key and one or more block property values. For example, block property values corresponding to a query may include an MVCC timestamp interval, such that a user of a client device that initiated the query desires KV data that includes respective timestamps included within the timestamp interval. The method 800 may be executed by an iterator including one or more features as described herein. In some cases, the iterator may execute the method 800 as a part of a seek(k) SQL operation, where "k" is a particular search key for the query. A search key included in a received query may be referred to herein as a "target block property". As an example, a particular search key may be and/or include an MVCC timestamp interval or a particular enum value (e.g., an "Open" course identifier as described herein).

At step 802, to execute a seek(k) operation for a particular search key "k", an iterator operating at a node (e.g., node 120) may open an sstable from a plurality of sstables. An sstable may be selected from the plurality of sstables based on a key range corresponding to the sstable as described herein. As described herein, an sstable may include one or more table properties that are derived from block properties of data blocks included in an sstable. Opening the sstable may include accessing the sstable file, reading version information included in the sstable file (e.g., in a footer of the sstable file), and/or identifying locations and lengths of index blocks and data blocks included in the sstable file.

At step 804, the iterator may load one or more table properties included in a table property block of the sstable. In some cases, an sstable may not include a table properties block if the sstable is not configured with any block properties.

At step 806, the iterator may search for at least one table property in the one or more loaded table properties. The table property searched by the iterator may be a table property indicated by the seek(k) operation (as described in step 802), such that the initiator of the operation desires to filter the seek operation based on the at least one searched table property. In some cases, the iterator may search for more than one table property. An example of a table property may be a block property for MVCC timestamps. The iterator may search according to the string names corresponding to the table properties, where a table property is a block property corresponding to a top-level index as described herein.

At step 808, the iterator may determine whether a type of the searched table property (e.g., from step 806) corresponds to a type of one of the one or more loaded table properties (e.g., from step 804). In some cases, the iterator may determine that the searched table property is included in the one or more loaded table properties when a type of the searched table property matches with a type of one of the one or more loaded table properties. For example, the iterator may search for a table property with a string name of "MVCC-time-interval" in the one or more loaded table properties. If the iterator determines the type of the searched table property (e.g., from step 806) does not match a type of a table property included in the one or more loaded table properties, the method may proceed to step 810. If the iterator determines the type of the searched table property (e.g., from step 806) does match a type of a table property included in the one or more loaded table properties, the method may proceed to step 812. In some cases, the iterator may determine whether more than one types of searched table properties match the types of the one or more loaded table properties, where the method may proceed to step 812 if at least one of the searched types of the table properties matches the types of any of the one or more loaded table properties.

At step 810, the iterator may execute a conventional seek operation for the seek(k) operation. A conventional seek operation may include executing a seek(k) operation without the use of block properties and block property filters as described herein. A conventional seek operation may include searching through the KV entries of each of the data blocks of an sstable by the order of the KV entries within the sstable (e.g., via the ordering the index blocks and data blocks in the sstable) to provide a response to the query. A response to the query for a conventional seek(k) operation may include values of KV entries corresponding to (e.g., matching) the search key.

At step 812, the iterator may determine whether a value (e.g., interval, identifier, etc.) of a target block property included in the seek operation (referred to as a "target block property value") intersects with an actual value of a table property corresponding to the sstable that matches a type of the target block property. A target block property value included in the seek operation may intersect with a value (e.g., value of a block property or table property) corresponding to the sstable if the target block property value is equivalent to the value and/or is at least partially included in an interval (e.g., range) defined by the value. For example, for a block property of an MVCC timestamp interval, a target block property value of [12, 50) may intersect with an actual table property value of [16, 61) for the intersecting interval of [16, 50). If the target block property value does not intersect with an actual value of the table property corresponding to the sstable, the method may proceed to step 814. If the target block property value intersects with an actual value of the table property corresponding to the sstable, the method may proceed to step 816.

At step 814, the iterator may skip the sstable for the seek operation and may proceed to search a subsequent sstable of the plurality of sstables of the database (if available).

At step 816, the iterator may load a top-level index block of the sstable. The top-level index block may include block property values that at least partially intersect with the target block property value described herein (e.g., for step 812).

At step 818, the iterator may decode a BlockHandle (e.g., BlockHandle 630*a*) for a key of the top-level index block. The iterator may initially decode the BlockHandle for the first key of the top-level index block and may iterate through the subsequent keys of the top-level index block (if present) in future repetitions. Decoding the BlockHandle may include identifying the position of a second-level index block within the sstable (e.g., based on the file-offset value of the BlockHandle tuple), identifying the block length of the second-level index block (e.g., based on the block-length value of the BlockHandle tuple), and determining the block property of the second-level index block (e.g., based on the properties byte sequence of the BlockHandle tuple).

At step 820, the iterator may determine whether the target block property value (e.g., of step 812) intersects with an actual value of the block property corresponding to the second-level index block (e.g., of step 818). A target block property value included in the seek operation may intersect with a value (e.g., value of a block property or table property) corresponding to the second-level index block if the target block property value is equivalent to the value and/or is at least partially included in an interval (e.g., range) defined by the value. For example, for MVCC timestamp intervals as the block property, a target block property value of [12, 50) may intersect with an actual block property value of [24, 45) for the intersecting interval of [24, 45). If the target block property value does not intersect with an actual value of the block property corresponding to the second-level index block, the method may proceed to step 822. If the target block property value intersects with an actual value of the block property corresponding to the second-level index block, the method may proceed to step 828.

At step 822, the iterator may increment to a subsequent key of the top-level index block. The iterator may increment to a subsequent key based on the target block property value not intersecting with an actual value of the block property corresponding to the second-level index block. In some cases, the top-level index block may not include additional keys to increment.

At step 824, the iterator may determine whether the end of the top-level index block has been reached. The end of the top-level index block may be reached if there are not any additional keys to increment (e.g., at step 822) from the previous key (e.g., with a BlockHandle decoded at step 818). If the end of the top-level index block has been reached, the method may proceed to step 826. If the end of the top-level index block has not been reached, the method may proceed to step 818.

At step 826, the iterator may return a null value (or any other suitable value). The iterator may return a null value as a response to the seek operation based on searching the entirety of the sstable based on the target block property value and key.

At step 828, the iterator may load a second-level index block mapped to the top-level index block of the sstable. The second-level index block may include block property values that at least partially intersect with the target block property value described herein (e.g., for step 820). The second-level index block may correspond to the key and BlockHandle decoded as described herein (e.g., for step 818).

At step 830, the iterator may decode a BlockHandle (e.g., BlockHandle 630a) for a key of the second-level index block. The iterator may initially decode the BlockHandle for the first key of the second-level index block and may iterate through the subsequent keys of the second-level index block (if present) in future repetitions. Decoding the BlockHandle may include identifying the position of a data block within the sstable (e.g., based on the file-offset value of the BlockHandle tuple), identifying the block length of the data block (e.g., based on the block-length value of the BlockHandle tuple), and determining the block property of the data block (e.g., based on the properties byte sequence of the BlockHandle tuple).

At step 832, the iterator may determine whether the target block property value (e.g., of step 812) intersects with an actual value of the block property corresponding to the data block (e.g., of step 828). A target block property value included in the seek operation may intersect with a value (e.g., value of a block property or table property) corresponding to the data block if the target block property value is equivalent to the value and/or is at least partially included in an interval (e.g., range) defined by the value. For example, for MVCC timestamp intervals as the block property, a target block property value of [12, 50) may intersect with an actual block property value of [31, 42) for the intersecting interval of [31, 42). If the target block property value does not intersect with an actual value of the block property corresponding to the data block, the method may proceed to step 834. If the target block property value intersects with an actual value of the block property corresponding to the data block, the method may proceed to step 838.

At step 834, the iterator may increment to a subsequent key of the second-level index block. The iterator may increment to a subsequent key based on the target block property value not intersecting with an actual value of the block property corresponding to the data block. In some cases, the second-level index block may not include additional keys to increment.

At step 836, the iterator may determine whether the end of the second-level index block has been reached. The end of the second-level index block may be reached if there are not any additional keys to increment from the previous key (e.g., with a BlockHandle decoded at step 830). If the end of the second-level index block has been reached, the method may proceed to step 822. If the end of the second-level index block has not been reached, the method may proceed to step 830.

At step 838, the iterator may load a data block mapped to the second-level index block of the sstable. The data block may include attributes that at least partially intersect with the target block property value described herein (e.g., for step 832). The data block may correspond to the key and BlockHandle decoded as described herein (e.g., for step 830).

At step 840, the iterator may read and return KV data for a key of the data block. The iterator may initially return KV data for the first key of the data block and may iterate through the subsequent keys of the data block (if present) in future repetitions. The iterator may return the KV data to the initiator of the seek operation by returning the KV data to a client device (e.g., client device 106) via a network.

At step 842, the iterator may increment to a subsequent key of the data block. The iterator may increment to a subsequent key based on (e.g., after) reading and returning KV data corresponding to the key of the data block. In some cases, the data block may not include additional keys to increment.

At step 844, the iterator may determine whether the end of the data block has been reached. The end of the data block may be reached if there are not any additional keys to increment from the previous key (e.g., with KV data read and returned at step 840). If the end of the data block has been reached, the method may proceed to step 834. If the end of the data block has not been reached, the method may proceed to step 840.

Further Description of Some Embodiments

Figure 9:
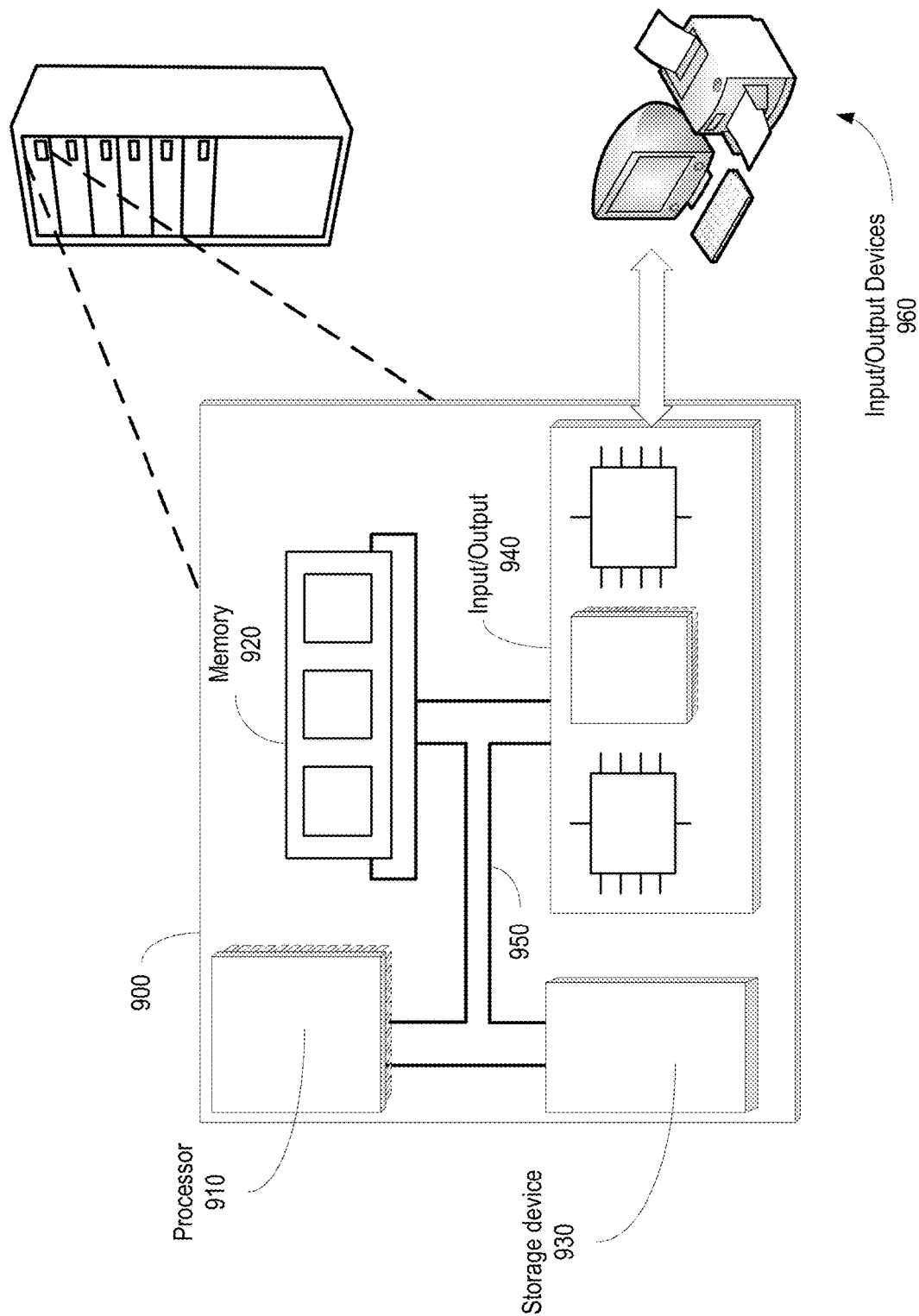
FIG. 9 is a block diagram of an example computer system.

FIG. 9 is a block diagram of an example computer system 900 that may be used in implementing the technology described in this document. General-purpose computers, network appliances, mobile devices, or other electronic systems may also include at least portions of the system 900. The system 900 includes a processor 910, a memory 920, a storage device 930, and an input/output device 940. Each of the components 910, 920, 930, and 940 may be interconnected, for example, using a system bus 950. The processor 910 is capable of processing instructions for execution within the system 900. In some implementations, the processor 910 is a single-threaded processor. In some implementations, the processor 910 is a multi-threaded processor. The processor 910 is capable of processing instructions stored in the memory 920 or on the storage device 930.

The memory 920 stores information within the system 900. In some implementations, the memory 920 is a non-transitory computer-readable medium. In some implementations, the memory 920 is a volatile memory unit. In some implementations, the memory 920 is a non-volatile memory unit.

The storage device 930 is capable of providing mass storage for the system 900. In some implementations, the storage device 930 is a non-transitory computer-readable medium. In various different implementations, the storage device 930 may include, for example, a hard disk device, an optical disk device, a solid-date drive, a flash drive, or some other large capacity storage device. For example, the storage device may store long-term data (e.g., database data, file system data, etc.). The input/output device 940 provides input/output operations for the system 900. In some implementations, the input/output device 940 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 960. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 930 may be implemented in a distributed way over a network, for example as a server farm or a set of widely distributed servers, or may be implemented in a single computing device.

Although an example processing system has been described in FIG. 9, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A computer-implemented method for filtering data stored by a log-structured merge tree, the method comprising:
   executing operations on one or more processors of one or more servers, the operations comprising:
   receiving, from a client device, a query directed to a database stored by a plurality of data files, wherein the query comprises a target block property comprising a type and value;
   comparing a value of the target block property to a value of a first block property encoded for a first data block comprised in a first data file of the plurality of data files, wherein the first data file comprises a plurality of key-value entries each comprising a key and a value, wherein the first data block comprises a first group of the plurality of key-value entries, wherein the first block property is indicative of the respective attributes of the first group of the plurality of key-value entries; and
   sending, when the target block property intersects with the first block property of the first data block, the values corresponding to the first group of the plurality of key-value entries of the first data block to the client device.

2. The method of claim 1, wherein each data file of the plurality of data files comprises a sorted strings table (sstable) file.

3. The method of claim 1, wherein each attribute provides an indication of a timestamp, version, or value of the respective key-value entry.

4. The method of claim 1, wherein the value of the target block property comprises a first timestamp interval, and wherein the value of the first block property comprises a second timestamp interval.

5. The method of claim 1, wherein each key of the plurality of key-value entries comprises the respective attribute.

6. The method of claim 1, wherein each value of the plurality of key-value entries comprises the respective attribute.

7. The method of claim 1, wherein the first data block comprises the first group of the plurality of key-value entries sorted by the respective keys of the first group of the plurality of key-value entries.

8. The method of claim 1, wherein the first data file comprises the plurality of key-value entries, wherein the keys of the plurality of key-value entries comprise a segment of a key space of permissible keys.

9. The method of claim 1, wherein the operations further comprise:
   identifying the first data file of the plurality of data files;
   identifying one or more table properties corresponding to the first data file; and
   comparing a type of a first table property of the one or more table properties to the type of the target block property.

10. The method of claim 9, wherein each of the one or more table properties is indicative of one or more block properties of a primary index block, and wherein the operations further comprise:
    determining, based on comparing the type of the first table property to the type of the target block property, the type of the first table property of the one or more table properties does not correspond to the type of the target block property; and
    iterating, based on the query, through a plurality of data blocks of the first data file, wherein the plurality of data blocks comprise the first data block.

11. The method of claim 9, wherein each of the one or more table properties is indicative of one or more block properties of a primary index block, and wherein the operations further comprise:
    determining, based on comparing the type of the first table property to the type of the target block property, the type of the first table property of the one or more table properties corresponds to the type of the target block property; and
    comparing a value of the first table property to the value of the target block property.

12. The method of claim 11, wherein the operations further comprise:
    determining, based on comparing the value of the first table property to the value of the target block property, the first table property and the target block property do not intersect; and
    identifying a second data file of the plurality of data files.

13. The method of claim 11, wherein the operations further comprise:
    determining, based on comparing the value of the first table property to the value of the target block property, the first table property and the target block property intersect;
    identifying a first key-value entry of the primary index block;
    decoding a second block property from a first block handle comprised in the first key-value entry of the primary index block, wherein the first block handle comprises an indication of a location of a secondary index block in the first data file and an indication of a length of the secondary index block; and
    comparing a value of the second block property to the value of the target block property.

14. The method of claim 13, wherein the operations further comprise:
    determining, based on comparing the value of the second block property to the value of the target block property, the second block property and the target block property do not intersect; and
    identifying a second key-value entry of the primary index block.

15. The method of claim 14, wherein the operations further comprise:
    sending, based on determining the second block property and the target block property do not intersect, a null value to the client device.

16. The method of claim 13, wherein the operations further comprise:
    determining, based on comparing the value of the second block property to the value of the target block property, the second block property and the target block property intersect;
    identifying a first key-value entry of the secondary index block;
    decoding the first block property from a second block handle comprised in the first key-value entry of the secondary index block, wherein the second block handle comprises an indication of a location of the first data block in the first data file and an indication of a length of the first data block; and
    comparing the value of the first block property to the value of the target block property.

17. The method of claim 16, wherein the operations further comprise:
- determining, based on comparing the value of the first block property to the value of the target block property, the first block property and the target block property do not intersect; and
- identifying a second key-value entry of the secondary index block.

18. The method of claim 16, wherein the operations further comprise:
- determining, based on comparing the value of the first block property to the value of the target block property, the first block property and the target block property intersect;
- identifying the first data block; and
- identifying the respective values corresponding to the first group of the plurality of key-value entries of the first data block.

19. A system for filtering data stored by a log-structured merge tree, the system comprising:
- one or more servers each having one or more processors, the processors configured to execute instructions to perform operations comprising:
  - receiving, from a client device, a query directed to a database stored by a plurality of data files, wherein the query comprises a target block property comprising a type and value;
  - comparing a value of the target block property to a value of a first block property encoded for a first data block comprised in a first data file of the plurality of data files, wherein the first data file comprises a plurality of key-value entries each comprising a key and a value, wherein the first data block comprises a first group of the plurality of key-value entries, wherein the first block property is indicative of the respective attributes of the first group of the plurality of key-value entries; and
  - sending, when the target block property intersects with the first block property of the first data block, the values corresponding to the first group of the plurality of key-value entries of the first data block to the client device.

20. The system of claim 19, wherein each data file of the plurality of data files comprises a sorted strings table (sstable) file.

21. The system of claim 19, wherein each attribute provides an indication of a timestamp, version, or value of the respective key-value entry.

22. The system of claim 19, wherein the value of the target block property comprises a first timestamp interval, and wherein the value of the first block property comprises a second timestamp interval.

23. The system of claim 19, wherein each key of the plurality of key-value entries comprises the respective attribute.

24. The system of claim 19, wherein each value of the plurality of key-value entries comprises the respective attribute.

25. The system of claim 19, wherein the first data block comprises the first group of the plurality of key-value entries sorted by the respective keys of the first group of the plurality of key-value entries.

26. The system of claim 19, wherein the first data file comprises the plurality of key-value entries, wherein the keys of the plurality of key-value entries comprise a segment of a key space of permissible keys.

27. The system of claim 19, wherein the operations further comprise:
- identifying the first data file of the plurality of data files;
- identifying one or more table properties corresponding to the first data file; and
- comparing a type of a first table property of the one or more table properties to the type of the target block property.

28. The system of claim 27, wherein each of the one or more table properties is indicative of one or more block properties of a primary index block, and wherein the operations further comprise:
- determining, based on comparing the type of the first table property to the type of the target block property, the type of the first table property of the one or more table properties does not correspond to the type of the target block property; and
- iterating, based on the query, through a plurality of data blocks of the first data file, wherein the plurality of data blocks comprise the first data block.

29. The system of claim 27, wherein each of the one or more table properties is indicative of one or more block properties of a primary index block, and wherein the operations further comprise:
- determining, based on comparing the type of the first table property to the type of the target block property, the type of the first table property of the one or more table properties corresponds to the type of the target block property; and
- comparing a value of the first table property to the value of the target block property.

30. The system of claim 29, wherein the operations further comprise:
- determining, based on comparing the value of the first table property to the value of the target block property, the first table property and the target block property do not intersect; and
- identifying a second data file of the plurality of data files.

* * * * *